United States Patent [19]

Nakazato et al.

[11] Patent Number: 4,891,710

[45] Date of Patent: Jan. 2, 1990

[54] BI-LEVEL IMAGE DISPLAY SIGNAL PROCESSING APPARATUS

[75] Inventors: Katsuo Nakazato, Tokyo; Toshiharu Kurosawa, Yokohama; Yuji Maruyama, Tokyo; Kiyoshi Takahashi; Hiroyoshi Tsuchiya, both of Kawasaki, all of Japan

[73] Assignee: Matsushita Electric Industrial Co., Ltd., Osaka, Japan

[21] Appl. No.: 136,486

[22] Filed: Dec. 21, 1987

[30] Foreign Application Priority Data

| Dec. 19, 1986 | [JP] | Japan | 61-304249 |
| Dec. 19, 1986 | [JP] | Japan | 61-304198 |
| Dec. 19, 1986 | [JP] | Japan | 61-304243 |
| Dec. 19, 1986 | [JP] | Japan | 61-304248 |
| Feb. 27, 1987 | [JP] | Japan | 62-45577 |
| Jul. 14, 1987 | [JP] | Japan | 62-175171 |

[51] Int. Cl.$^4$ .......................................... H04N 1/40
[52] U.S. Cl. ................................. 358/443; 358/464
[58] Field of Search .............. 358/282, 283, 284, 75, 358/903

[56] References Cited

U.S. PATENT DOCUMENTS

| 4,339,774 | 7/1982 | Temple | 358/903 |
| 4,449,150 | 5/1984 | Kato |  |
| 4,654,721 | 3/1987 | Goertzel et al. | 358/75 |
| 4,692,811 | 9/1987 | Tsuchiya et al. | 358/282 |

FOREIGN PATENT DOCUMENTS 2171316  9/1973  France.
1422866  1/1976  United Kingdom.

OTHER PUBLICATIONS

"An Adaptive Algorithm for Spatial Grey Scale" by Robert Floyd & Louis Steinberg; SID 75 DIGEST p. 36.
Proceedings of the S.I.D., vol. 24, No. 3, 1983, pp. 253-258, SID, Los Angeles, CA, US; C. Billotet-Hoffmann et al.: "On the error diffusion technique for electronic halftoning" p. 254.

Primary Examiner—James J. Groody
Assistant Examiner—David E. Harvey
Attorney, Agent, or Firm—Lowe, Price, Leblanc, Becker & Shur

[57] ABSTRACT

An image signal processing circuit for converting step-gradation density values ($I_{xy}$) of successive picture elements to bi-level values ($P_{xy}$) for display by a bi-level display device, in which a bi-level error ($E_{xy}$) between a bi-level value determined for a picture element and an appropriate density value for the element is apportioned among a set of peripherally adjacent picture elements (A to D) by computing a corresponding set of error apportionment values ($G_A$ to $G_D$), and in which a difference between the sum total of these apportionment values and the bi-level error is derived, and error apportionment is modified such as to eliminate the effects of this difference. Improved reproduction is thereby attained of image regions which are of uniformly high density or low density.

11 Claims, 14 Drawing Sheets

BI-LEVEL IMAGE DISPLAY SIGNAL PROCESSING APPARATUS

RELATED APPLICATIONS

The present application is related to the co-pending commonly assigned application by Yuji Haruyama et al, Ser. No. 110,082, filed on Oct. 16, 1987. That co-pending application is also directed to an apparatus for processing density level signal values representing an image, to produce bi-level signal values which are suitable for reproducing a pseudo-continuous tone image by using a bi-level display device.

BACKGROUND OF THE INVENTION

A requirement has arisen in recent years for high-quality reproduction of both printed images and step gradation images (for example an image representing a continuous-tone image as a plurality of step gradation density values) by utilizing a bi-level type of display device such as a gas plasma dot-matrix display which is inherently capable of generating only two levels of display density. This is achieved by generating a spatial gray scale display image. However problems are presented by the prior art methods proposed for implementing such reproduction.

With such a bi-level display device, each picture element generated by the display can be set (e.g. as an element of a dot matrix) in either a light or a dark state. There have been various proposals for implementing pseudo-continuous tone reproduction by such display devices by employing a spatial gray scale, which are based on setting a relatively high proportion of picture elements of the display in the light state within a display region which is to represent a light (i.e. low-density) region of the original image, and a high proportion in the dark state in the case of a dark (i.e. high-density) region of the original image.

The most well-known method of providing such pseudo-continuous tone reproduction is the dither technique, whereby a step gradation representation of a continuous tone image is reproduced on the basis of numbers of dots within each of predetermined areas of the continuous tone image, by utilizing a dither matrix. Threshold values of the dither matrix are compared with the level of an input signal, one picture element at a time, to thereby execute bi-level image conversion processing. However this method has the disadvantage that the step gradation reproduction characteristic and the resolution of the image that is obtained will both depend directly upon the size of the dither matrix, and have a mutually incompatible relationship. Moreover with the dither technique, it is difficult to avoid the generation of moire patterns, particularly when printed images are reproduced.

A method has been proposed in the prior art which is highly effective in overcoming these problems of the dither method. This is the "error diffusion" method, which has been proposed by R. Floyd and L. Steinberg under the title "An Adaptive Algorithm for Spatial Gray Scale", published in the SID 75 Digest, pp 36-37. The basic principles of the proposed method are as follows. To determine whether a picture element of the input signal is to be displayed at the dark or at the light level in the image generated by the bi-level display device, the corresponding level of the input image signal is compared with a threshold value, and a light/dark decision thereby made. The density value (i.e. completely dark or completely light) which is thereby determined for that picture element will in general be in error with respect to the desired density of that element, i.e. with respect to the density of the corresponding picture element in the original image. This error is referred to in the following as the bi-level conversion error. However with the error diffusion method, the effect of this error are substantially reduced by modifying (in accordance with the value of the error) the respective values of desired density to be subsequently used in processing respective ones of a specific set of picture elements which are positioned peripherally adjacent to the object picture element, and have not yet been processed. This modification is performed by apportioning the value of error obtained for that object picture element among these peripheral picture elements, with the error being apportioned in accordance with predetermined fixed factors. Such factors are referred to in the following as apportionment factors.

The term "object picture element" as used herein has the significance of a picture element which is currently being processed, to determine a corresponding bi-level display image value, with data being utilized in that processing which have been obtained beforehand during processing of preceding picture elements.

The error diffusion method is superior to the dither method with regard to image resolution and the reproduction characteristic for a step gradation source image, and enables the degree of generation of moire patterns to be made very small even when a printed image is being reproduced. However in the case of reproduction of an image which has only small amounts of changes in density, such as a computer-generated image having areas of extremely uniform density, the error diffusion method produces regions of texture in the reproduced image. This texture is inherent to the error diffusion method, and for this reason the error diffusion method has not been widely adopted. The reason for generation of this texture is that a fixed relationship is continuously maintained between an object picture element and the aforementioned set of picture elements which are disposed peripherally adjacent to the object picture element, and fixed values are also maintained for the respective proportions by which the bi-level conversion error of the object picture element is apportioned among these peripheral picture elements.

Furthermore, if it is attempted to produce a practical type of digital computation processing circuit for implementing this prior art error diffusion method, it is found that the sum of the aforementioned error apportionment values which are generated during processing of each picture element is not equal to the corresponding bi-level error which is computed for that picture element. This is due to inevitable inaccuracies which arise in the process of computing these error apportionment values, due to discarding of low-significance bits of certain computation results. As a result, the entire bi-level error is not correctly apportioned among the picture elements which are peripherally adjacent to the object picture element, so that all of the possible step gradation density levels of the input signal cannot be properly reproduced in the final image. This is especially true when the input signal level represents a high value or a low value of image density, and hence the range of step gradation image density values which can be reproduced by the prior art error diffusion method is made narrow.

It is a further disadvantage of the prior art is that a plurality of respectively different computations must be executed consecutively in order to process each picture element, so that it is difficult to achieve a high speed of image processing.

SUMMARY OF THE INVENTION

It is an objective of the present invention to provide an image signal processing apparatus which overcomes the disadvantages of the prior art error diffusion method described above, and which provides a display image having high resolution and an excellent step gradation reproduction characteristic, with only very small amounts of moire pattern being produced even when the source image is a printed image, and with no texture being generated even in image regions which are of highly uniform density.

The present invention provides an image signal processing apparatus for receiving an input signal comprising successive digital level values each representing a step gradation density level of a corresponding picture element of a source image, to produce a bi-level image signal by sequentially converting these level values to corresponding bi-level values in respective processing steps, with an error between the bi-level value derived for each of the picture elements and a required density level for that picture element being apportioned among a set of peripherally adjacent picture elements which have not yet been processed.

According to a first embodiment, the present invention provides an apparatus for sequentially processing input level values representing respective density levels of picture elements to produce corresponding bi-level values, which comprises:

error memory means for storing a bi-level error of an object picture element in a set of memory locations respectively corresponding to a set of picture elements which have not yet been processed and are peripherally adjacent to the object picture element;

input correction means for adding an input level value of the object picture element to an accumulated error which has been previously stored at a location in the error memory means corresponding to the object picture element position, to thereby produce a corrected input level value;

bi-level conversion means for comparing the corrected input level value with a predetermined level value to thereby determine a bi-level value for the object picture element;

difference computation means for obtaining a bi-level error which is the difference between the corrected input level value and the bi-level value determined for the object picture element;

apportionment factor generating means for generating apportionment factors for apportioning the bi-level error among the set of picture elements which have not yet been processed and are positioned at the periphery of the object picture element;

error apportionment value computing means for computing, based on the bi-level error of the object picture element and on the apportionment factors, a set of error apportionment values respectively corresponding to the set of picture elements which have not yet been processed and are positioned at the periphery of the object picture element;

residual error computing means for computing the sum total of the error apportionment values and for computing a residual error which is the difference between the bi-level value produced from the difference computing means and the sum total, and for apportioning the residual error as a set of residual error apportionment values by utilizing respective factors which have been predetermined for respective ones of the set of unprocessed picture elements positioned at the periphery of the object picture element;

apportionment value computing means for computing respective apportionment values for the set of unprocessed picture elements which are peripherally adjacent to the object picture element, from the error apportionment values and the residual error apportionment values; and updating means for adding the apportionment values to respective accumulated error values which have been stored previously at respectively corresponding locations in the error memory means, and for storing the addition results in the error memory means as updated accumulated error values.

As a result of the above configuration of the first embodiment, reapportionment correction is performed of the error apportionment values which respectively correspond to the set of unprocessed picture elements positioned at the periphery of the object picture element, to compensate for a residual error which is the difference between the bi-level error of the object picture element and the sum total of the error apportionment values respectively corresponding to the set of unprocessed picture elements positioned at the periphery of the object picture element. It is thereby ensured that the sum total of the error apportionment values of these peripheral picture elements is equal to the bi-level error, enabling an improved step density gradation reproduction characteristic to be achieved in image regions of high density or low density, while in addition the generation of moire patterns is suppressed.

According to a second embodiment, the present invention provides an apparatus for sequentially processing input level values representing respective density levels of picture elements to produce corresponding bi-level values, which comprises:

error memory means for storing a bi-level error of an object picture element in a set of memory locations respectively corresponding to a set of picture elements which have not yet been processed and are peripherally adjacent to the object picture element;

input correction means for adding an input level value of the object picture element to an accumulated error which has been previously stored at a location in the error memory means corresponding to the object picture element position, to thereby produce a corrected input level value;

bi-level conversion means for comparing the corrected input level value with a predetermined value to determine a bi-level value for the object picture element;

difference computation means for obtaining a bi-level error which is the difference between the corrected input level value and the bi-level value of the object picture element;

apportionment factor generating means for generating apportionment factors for apportioning the bi-level error among the set of picture elements which have not yet been processed and are positioned at the periphery of the object picture element;

error apportionment value computing means for computing, based on the bi-level error from the error computation means and the apportionment factors, error apportionment values respectively corresponding to the set of picture elements which have not yet been processed and are positioned at the periphery of the object picture element;

residual error computing means for computing the sum total of the error apportionment values and for computing a residual error which is the difference between the bi-level error and the sum total; and error updating means for adding a predetermined one of the error apportionment values to the residual error, and for adding the remaining ones of the error apportionment values to respective accumulated error values which have been stored previously at respectively corresponding locations in the error memory means, and storing the results of each of these additions in the error memory means as updated accumulated error values.

With the above configuration of the second embodiment, a residual error which is the difference between a bi-level error and the sum total of the error apportionment values for the the set of unprocessed picture elements positioned at the periphery of the object picture element, derived during processing of the object picture element, is utilized for correction during the next picture element processing operation, such that the aforementioned sum total is made equal to the bi-level error. This enables an improved continuous tone reproduction characteristic to be attained in image regions of high density or low density, and also is effective in suppressing the generation of moire pattern.

According to a third embodiment, the present invention provides an apparatus for sequentially processing input level values representing respective density levels of picture elements to produce corresponding bi-level values, which comprises:

error memory means for storing a bi-level error of an object picture element in a set of memory locations respectively corresponding to a set of picture elements which have not yet been processed and are peripherally adjacent to the object picture element;

input correction means for adding an input level value of the object picture element to an accumulated error which has been previously stored at a location in the error memory means corresponding to the object picture element position, to thereby produce a corrected input level value;

bi-level conversion means for comparing the corrected input level value with a predetermined value to determine a bi-level value for the object picture element;

difference computation means for obtaining, as a digital value comprising more than three bits, a bi-level error $E_{xy}$ which is the difference between the corrected input level value and the bi-level value of the object picture element;

bi-level error apportionment means for extracting the n least significant bits of the bi-level error $E_{xy}$ and producing these bits as a bi-level error $E_{xyl}$, and for setting each of these n least significant bits of the bi-level error $E_{xy}$ to zero and producing the result as a bi-level error $E_{xyu}$;

apportionment factor generating means for generating apportionment factors for apportioning the bi-level error $E_{xyu}$ among the set of picture elements which have not yet been processed and are positioned at the periphery of the object picture element;

apportionment value computing means for computing, based on the bi-level error $E_{xyu}$ and the apportionment factors from the apportionment factor generating means, apportionment values respectively corresponding to the set of picture elements which have not yet been processed and are positioned at the periphery of the object picture element; and error updating means for adding a predetermined one of the error apportionment values to the bi-level error $E_{xyl}$ and for adding the remaining error apportionment values to respective accumulated error values which have been stored previously at respectively corresponding locations in the error memory means, and for storing the addition results in the error memory means as respective updated accumulated error values.

With the above configuration of the third embodiment, the n least significant bits of the bi-level error $E_{xy}$ are apportioned to one of the the set of unprocessed picture elements positioned at the periphery of the object picture element, while the bi-level error $E_{xy}$ with the n least significant bits thereof reset to zero is apportioned, in accordance with respective error apportionment factors, among other ones of these peripheral picture elements. As a result, the sum total of the error apportionment values for these peripheral picture elements can be made identical to the bi-level error for the object picture element, to thereby achieve an improvement in the step gradation reproduction characteristic of the reproduced image when the input signal level to the apparatus represents an image region having a low value of density or a high value of density, while in addition the generation of moire patterns is effectively suppressed.

According to a fourth embodiment, the present invention provides an apparatus for sequentially processing input level values representing respective density levels of picture elements to produce corresponding bi-level values, which comprises:

error memory means for storing a bi-level error of an object picture element in a set of memory locations respectively corresponding to a set of picture elements which have not yet been processed and are peripherally adjacent to the object picture element;

input correction means for adding an input level value of the object picture element to an accmulated error which has been previously stored at a location in the error memory means corresponding to the object picture element position, to thereby produce a corrected input level value;

bi-level conversion means for comparing the corrected input level value with a predetermined value to determine a bi-level value for the object picture element;

difference computation means for obtaining a bi-level error which is the difference between the corrected input level value and the bi-level value of the object picture element;

error computation means for computing a correction error based on the bi-level error and a factor which is a function of the threshold level;

apportionment factor generating means for generating apportionment factors for apportioning the correction error among the set of picture elements which have not yet been processed and are positioned at the periphery of the object picture element, the apportionment factors being generated by selection from a plurality of sets of apportionment factors at intervals having a predetermined alteration period; and error apportionment and updating means for computing error apportionment values respectively corresponding to the set of picture elements which have not yet been processed and are peripherally adjacent to the object picture element, from the correction error and the apportionment factors, adding the error apportionment values to respective accumulated error values which have been stored previously at respectively corresponding locations in the error memory means, and for storing the results of the additions in the error memory means as updated accumulated error values.

With the above configuration of the fourth embodiment, the overall level of density of a reproduced bi-level image can be adjusted, i.e. the displayed image can be made darker or lighter overall as desired, by adjusting the threshold level which is used in judging bi-level values for the picture elements. To ensure accurate operation of the apparatus even when such threshold level variation is executed, the bi-level error of an object picture element is apportioned among peripherally adjacent picture element positions in accordance with a correction error, which is derived by computation using the bi-level error and a factor which is a function of the threshold level.

According to a fifth embodiment, the present invention provides an apparatus for sequentially processing input level values representing respective density levels of picture elements to produce corresponding bi-level values, which comprises:

density modulation means for adding to the input level values respective ones of successively generated density level values which vary in amplitude and polarity independently of the input level values, to produce successive modulated input level values;

error memory means for storing a bi-level error of an object picture element in a set of memory locations respectively corresponding to a set of picture elements which have not yet been processed and are peripherally adjacent to the object picture element;

input correction means for adding a modulated input level value of an object picture element to an accumulated error which has been previously stored at a location in the error memory means corresponding to the object picture element position, to thereby produce a corrected input level value;

difference computation means for obtaining a bi-level error which is the difference between the corrected input level value and the bi-level value of the object picture element;

apportionment factor generating means for generating apportionment factors for apportioning the bi-level error among the set of picture elements which have not yet been processed and are positioned at the periphery of the object picture element, the apportionment factors being generated by randomly altering mutual correspondences between picture element positions and apportionment factors of a single set of apportionment factors, the random alteration being executed periodically with a predetermined alteration period; and error apportionment and updating means for computing error apportionment values respectively corresponding to the set of picture elements which have not yet been processed and are peripherally adjacent to the object picture element, from the bi-level error and the apportionment factors, adding the error apportionment values to respective accumulated error values which have been stored previously at respectively corresponding locations in the error memory means, and for storing the results of the additions in the error memory means as updated accumulated error values.

With the above configuration of the fifth embodiment, the density modulation means functions to superimpose on the density levels of the picture elements of the source image respective density values which vary in amplitude and polarity in a manner which is independent of the picture element density levels. The resultant variations in displayed image density are determined such as to have a total value of zero when computed over each of successively positioned small regions of the displayed image, so that no visible effects are produced as a result of this input density level modulation operation, on the displayed image which is produced using the output bi-level signal from the apparatus. As a result, the generation of a texture pattern in the displayed image is effectively prevented, even in image regions which are of extremely uniform density.

According to a sixth embodiment, the present invention provides an apparatus for sequentially processing input level values representing respective density levels of picture elements to produce corresponding bi-level values, which comprises:

error memory means for storing a bi-level error of an object picture element in a set of memory locations respectively corresponding to a set of picture elements which have not yet been processed and are peripherally adjacent to the object picture element;

input correction means for adding the input level of an object picture element to an accumulated error which has been previously stored at a position within the error memory means corresponding to the object picture element, to thereby produce a corrected input level;

difference computation means for subtracting the corrected input level from the first and second predetermined output levels to produce a first difference level and a second difference level respectively, prior to obtaining the bi-level value for the object picture element, storing these differences temporarily in respective registers which produce as respective outputs therefrom a difference level $D_1$ and a difference level $D_2$;

bi-level conversion means for respectively adding the difference levels $D_1$ and $D_2$ to a bi-level error stored during a preceding picture element processing operation to thereby obtain errors $E_1$ and $E_2$ respectively, comparing the error $E_1$ with a predetermined threshold value to thereby obtain a bi-level value for the object picture element, selecting error $E_1$ or error $E_2$ in accordance with the bi-level value thus obtained, to thereby obtain a bi-level error for the object picture element, and storing the bi-level error temporarily in a bi-leve error register for use during a succeeding picture element processing operation;

apportionment factor generating means operating once in each of predetermined picture element processing intervals for generating a set of apportionment factors, by selection from a plurality of sets of apportionment factors, for apportioning the bi-level error of the object picture element among the set of picture elements which have not yet been processed and are positioned at the periphery of the object picture element; and error apportionment and updating means for computing respective error apportionment values corresponding to the set of picture elements which have not yet been processed and are positioned at the periphery of the object picture element, based on a value of bi-level error read out from the bi-level error register and the set of of apportionment factors produced from the apportionment factor generating means, adding the error apportionment values to respective values of accumulated error which have been stored previously at locations in the error memory means respectively corresponding to the set of peripheral picture elements, and storing the respective addition results in the error memory means as updated accumulated error values.

With the above configuration for the sixth embodiment, processing operations which must be performed sequentially to process each picture element in the case of the other embodiments of the invention are performed concurrently, for respectively different picture elements, so that a substantially increased processing speed can be attained.

DESCRIPTION OF THE PREFERRED EMBODIMENTS

Figure 1:
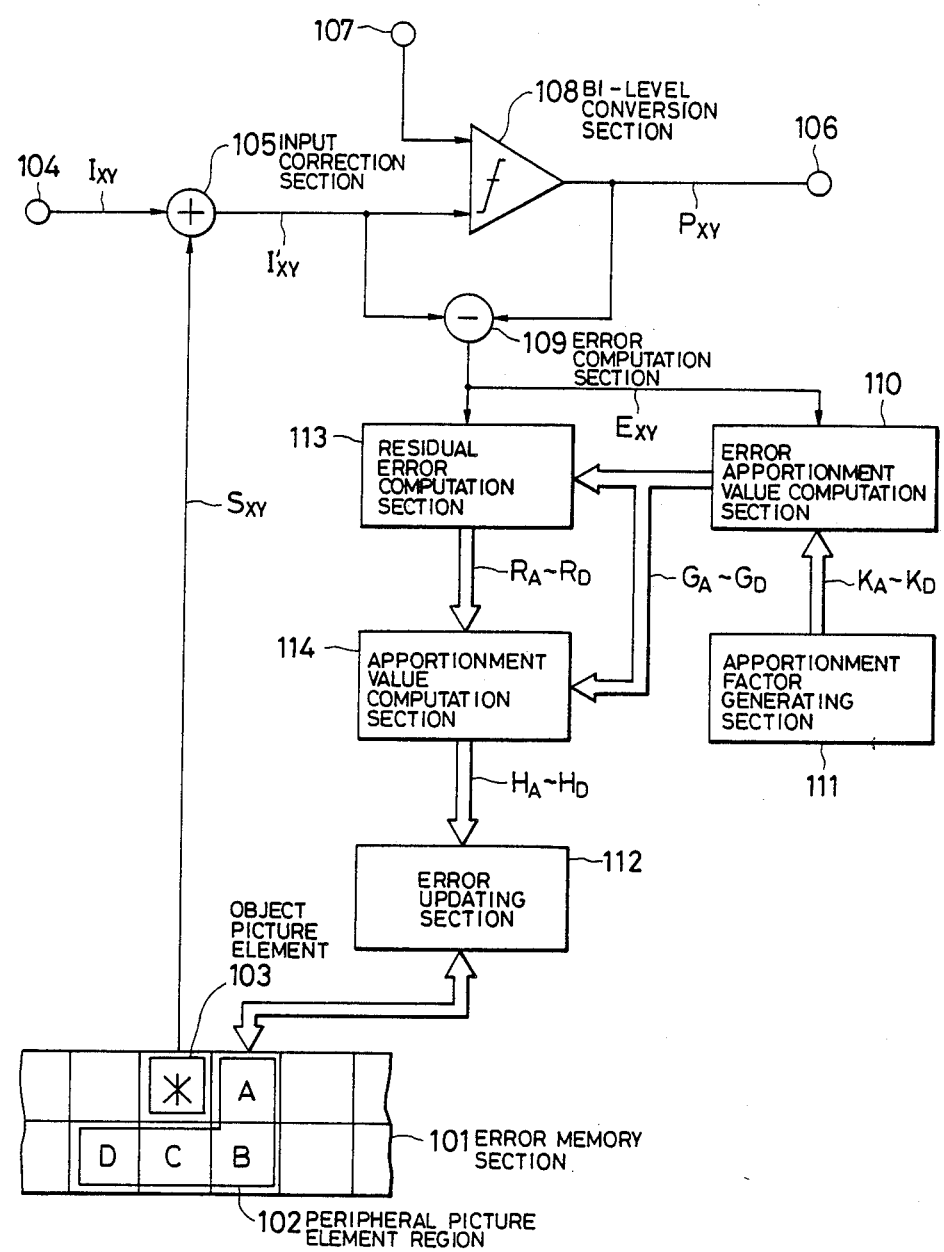
FIG. 1 is a conceptual block circuit diagram of a first embodiment of an image signal processing apparatus according to the present invention.

FIG. 1 is a general block diagram showing the essential components of a first embodiment of an image signal processing apparatus according to the present invention.

Numeral 104 denotes an input terminal to which is applied an input image signal $I_{xy}$ consisting of successive digital values constituting respective level values, each representing a step gradation density level of a corresponding picture element of a source image. The input image signal is derived by successively sampling the source image in units of picture elements, i.e. by successively sampling picture elements along each of a successively selected lines of picture elements, each line being aligned in a direction referred to in the following as the x-direction, the lines being successively arranged along a direction perpendicular thereto (referred to in the following as the y-direction), so that each picture element can be defned by x and y-coordinates. The apparatus functions to produce a a bi-lvel output value $P_{xy}$ in response to each input level value $I_{xy}$, from an output terminal 106 by sequentially converting the input level values in respective processing steps. The bi-level output values that are thus produced can each represent either of two values, designated as O and R in the following, corresponding to a low and a high density (i.e. light and dark state) respectively of a bi-level display image produced on the basis of these bi-level values. An error between the bi-level value derived for a picture element and the density level which is actually appropriate for that picture element (defined as described hereinafter) is apportioned among a set of peripherally adjacent picture elements which have not yet been processed.

In FIG. 1, the display coordinates of an object picture element (i.e. a picture element for which image processing is currently being executed to generate a corresponding bi-level output value) are designated as (x,y). Reference numeral 101 denotes an error memory section, used to store values of accumulated error as described hereinafter. Numeral 103 denotes a location in the error memory section 101 in which is stored the accumulated error value for the object picture element, the object picture element position being indicated by the * symbol, and numeral 102 denotes a storage region of error memory 101 containing a set of memory locations respectively corresponding to positiones of a set of picture elements (designated as A, B, C and D) that have not yet been processed and are positioned adjacent to the periphery of the object picture element. Each picture element is processed during an interval of fixed duration, synchronized with a sync signal. The picture element at position A is processed to generate a corresponding bi-level value immediately following processing of the object picture element, i.e. processing of successive picture elements takes place (in the x-direction) from left to right as seen in FIG. 1, and picture element positions D, C and B will be successively processed during scanning of the next line of picture elements, i.e. after one line shift in the y-direction has occurred.

Numeral 105 denotes an adder which amends the input signal level $I_{xy}$ by adding thereto an accumulated error $S_{xy}$ (whose value is determined by a combination of accumulated error values as described hereinafter) to produce a corrected input level $I'_{xy}$ for the object picture element, i.e. $I'_{xy} = I_{xy} + S_{xy}$. Numeral 107 denotes a terminal to which is applied a threshold level which in this embodiment is equal to R/2, and 108 denotes a device such as a comparator, for executing bi-level conversion of the input level $I'_{xy}$, by comparing the level $I'_{xy}$ with the fixed threshold value R/2, to produce as output a bi-level value $P_{xy}$ at the R level if $I'_{xy} > R/2$, and otherwise producing $P_{xy}$ at the 0 level. Numeral 109 denotes a subtractor, for computing a difference between the corrected input level $I'_{xy}$ and the output bi-level value $P_{xy}$ to thereby derive a bi-level conversion error $E_{xy}$ (i.e. $E_{xy} = I'_{xy} - P_{xy}$) for the object picture element.

The components described above, and their functions, might be envisaged on the basis of the published matter concerning the error diffusion method described hereinabove. The novel features of this embodiment of the present invention reside in an error apportionment value computation section 110, an apportionment factor generating section 111, an error updating section 112, a residual error computation section 113 and an apportionment value computation section 114, which are described in detail in the following.

The apportionment factor generating section 111 has stored therein beforehand a set of apportionment factors $K_A$ to $K_D$, and supplies these apportionment factors to the error apportionment value computation section 110, for apportioning the bi-level error $E_{xy}$ of the object picture element among the picture element positions A to D of the peripheral picture element region 102.

The error apportionment value computation section 110 operates in synchronism with a sync signal which is synchronized with the intervals of processing successive picture elements, and utilizes the bi-level error $E_{xy}$ for the object picture element (produced from the difference computation section 109) and the apportionment factors $K_A$ to $K_D$ to derive a set of error apportionment values $G_A$ to $G_D$ for the picture element positions A, B, C and D within the peripheral picture element region 102, employing equations (1) below.

$$G_A = K_A \times E_{xy} \\ G_B = K_B \times E_{xy} \\ G_C = K_C \times E_{xy} \\ G_D = K_D \times E_{xy}$$ (1)

The error apportionment value computation section 110 supplies these error apportionment values $G_A$ to $G_B$ to the error updating section 112 and the residual error computation section 113.

The residual error computation section 113 functions to derive, using equation (2) below, a residual error $J_B$ which is the difference between the bi-level error $E_{xy}$ and the sum total of the error apportionment values $G_A$ to $G_D$.

$$J_B = E_{xy} - \sum_{*=A}^{D} G*$$ (2)

In addition, the residual error $J_{xy}$ is multiplied by each of the factors $A_A$ to $A_D$, as shown in equations (5) below, to derive respective residual apportionment values $R_A$ to $R_D$.

$$R_A = A_A \times J_{xy} \\ R_B = A_B \times J_{xy} \\ R_C = A_C \times J_{xy} \\ R_D = A_D \times J_{xy}$$ (3)

The residual apportionment values $R_A$ to $R_D$ thus obtained are outputted to the apportionment value computation section 114 (described hereinafter), which functions to add the error apportionment values $G_A$ to $G_D$ from the error apportionment value computation section 110 to the residual apportionment values $RZ_A$ to $RZ_D$ respectively, and to output the results as respective apportionment values $H_A$ to $H_D$, to the error updating section 112. The error updating section 112 operates in synchronism with the aforementioned sync signal, and receives the apportionment values $H_A$ to $H_D$ from the apportionment value computation section 114, reads out a set of accumulated errors $S_A'$, $S_B'$, $S_C'$, $S_D'$ which had been derived and stored in the memory device 101 during previously executed picture element processing operations at locations respectivly corresponding to the picture elements of positions A, B, C and D in the peripheral picture element region 102 of error memory section 101, and derives new values of accumulated error $S_A$ to $S_D$ by utilizing equations (4) below.

$$S_A = S_A' + H_A \\ S_B = H_B \\ S_C = S_C' + H_C \\ S_D = S_D' + H_D$$ (4)

In addition, the error updating section 112 performs updating processing by writing into the error memory section 101 the new values of accumulated error $S_A$ to $S_D$, at locations respectively corresponding to the picture element positions A to D.

Figure 2A:
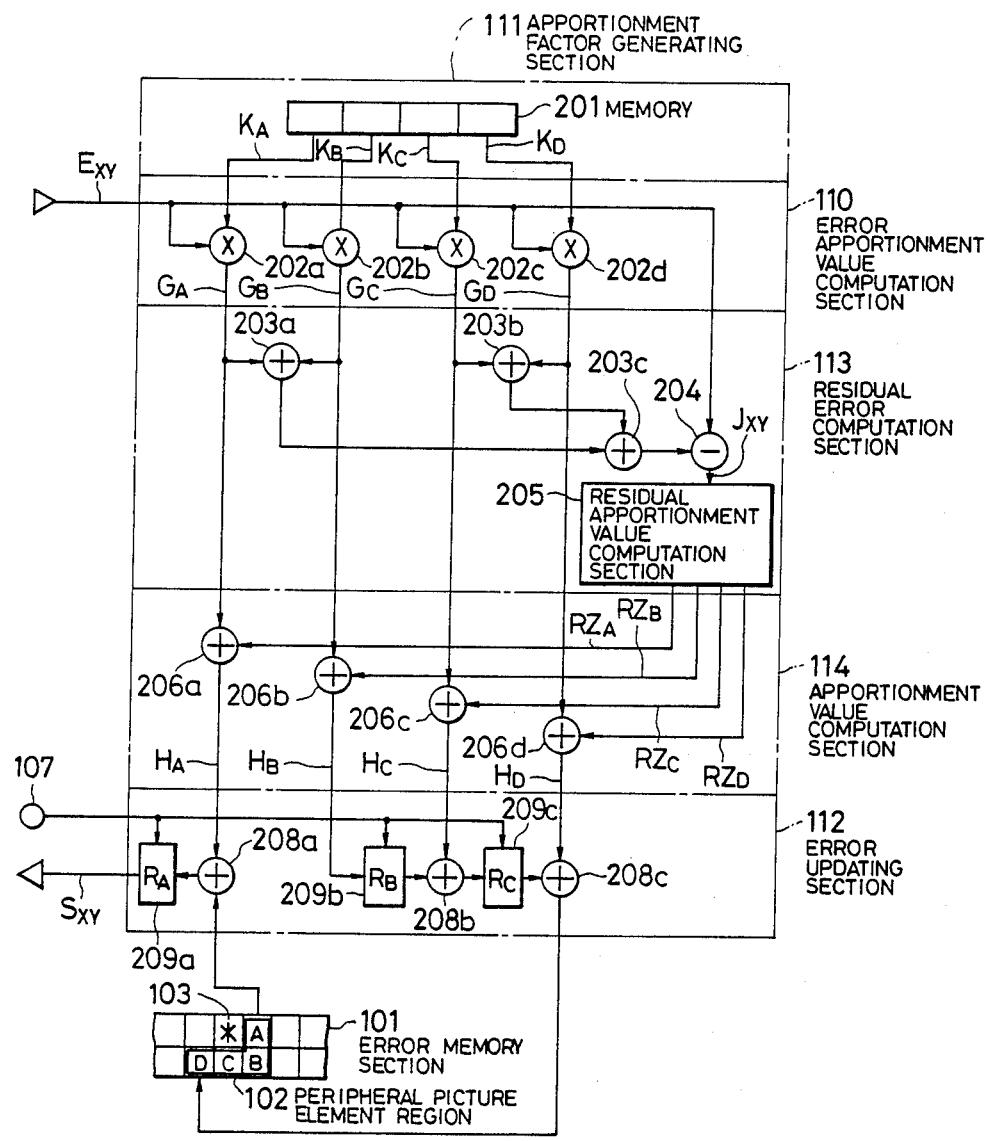
FIGS. 2(a) and 2(b) are block circuit diagrams to respectively show details of essential blocks in two different implementations of the first embodiment.

FIG. 2(a) shows specific configurations for the error apportionment value computation section 110, the apportionment factor generating section 111, the error updating section 112, the residual error computation section 113 and the apportionment value computation section 114 respectively shown in FIG. 1.

In FIG. 2(a), the apportionment factor generating section 111 incorporates a memory section 201 having stored therein beforehand (prior to the commencement of image processing) a set of apportionment factors $K_A$ to $K_D$. The memory section 201 can consist for example of a ROM (read-only memory) into which the apportionment value $K_A$ to $K_D$ have been written beforehand.

The error apportionment value computation section 110 includes a set of multipliers 202a to 202d, for deriving the respective products of the bi-level error $E_{xy}$ and each of the apportionment factors $K_A$ to $K_D$, as the error apportionment values $G_A$ to $G_D$. These error apportionment values are supplied to the apportionment value computation section 114 and the residual error computation section 113.

The residual error computation section 113 computes a value of residual error $J_{xy}$, which is the difference (derived by a subtractor 204) between the bi-level error $E_{xy}$ and the sum total of the error apportionment values $G_A$ to $G_D$ from the error apportionment value computation section 110 (this sum being derived by adders 203a to 203c). The residual error $J_{xy}$ is supplied to a residual apportionment value computation section 205, which includes a memory having a table of values stored therein, which contains the set of residual factors $A_A$ to $A_D$ of equation (3) above, and multipliers for multiplying the residual error $J_{xy}$ by each of these residual factors obtained from the table of values. The residual apportionment value generating section 205 thereby produces a set of residual apportionment values $RZ_A$ to $RZ_D$ in accordance with the residual error $J_{xy}$, which are used by the apportionment value computation section 114 for apportioning the residual error $J_{xy}$ amaong the peripheral picture element positions A to D respectively.

The apportionment value computation section 114 adds the error apportionment values $G_A$ to $G_D$ from the error apportionment value computation section 110 to the residual apportionment values $RZ_A$ to $RZ_D$ respectively, in a set of adders 206a to 206d, and thereby produces respective apportionment values $H_A$ to $H_D$ as outputs, which are applied to the error updating section 112.

The error updating section 112 operates in synchronism with a sync signal 215 which is applied to a sync input terminal 107 and constitutes the sync signal described hereinabove which is synchronized with successive picture element processing intervals. The error updating section 112 functions to add (in an adder 208a) the apportionment value $H_A$ to the accumulated error $S'_A$ corresponding to the picture element position A, which has been derived in a previously executed picture element processing operation and stored in the error memory section 101, and stores the result of the addition temporarily in an internal register 209a ($R_A$) to be used as the accumulated error $S_{xy}$ in the next picture element processing operation (i.e. the operation in which the picture element of position A in region 102 becomes the object picture element, and is processed). The apportionment value $H_B$ which is produced in the current picture element processing step, during processing of the object picture element, is temporarily stored (i.e. to be read out in the succeeding picture element processing interval) in an internal register 209b ($R_B$) as the accumulated error $S_B$ for the picture element position B. The apportionment value $H_C$ is added (in an adder 208b) to the data $S_B'$ which had been temporarily stored in the internal register 209b during the preceding picture element processing operation, and the result is stored in an internal register 209c ($R_C$) as the accumulated error $S_C$ for the picture element position C. The apportionment value $H_D$ is added to data $S_C'$ which had been temporarily stored in an internal register 209c ($R_C$) during processing of the preceding picture element, and the result is stored in a memory unit of the error memory section 101 at a location corresponding to the picture element position D, as the accumulated error $S_D$ for that picture element position.

It can be seen that with the configuration for the error updating section 112 described above, the only accessing of the memory unit in the memory section 101 consists of read-out access corresponding to the picture element position A and write-in access corresponding to the picture element position D. Each of the internal registers 209a etc. can be configured as simple latch circuits, for example. Thus, the memory section 101 can be easily implemented.

Figure 2B:
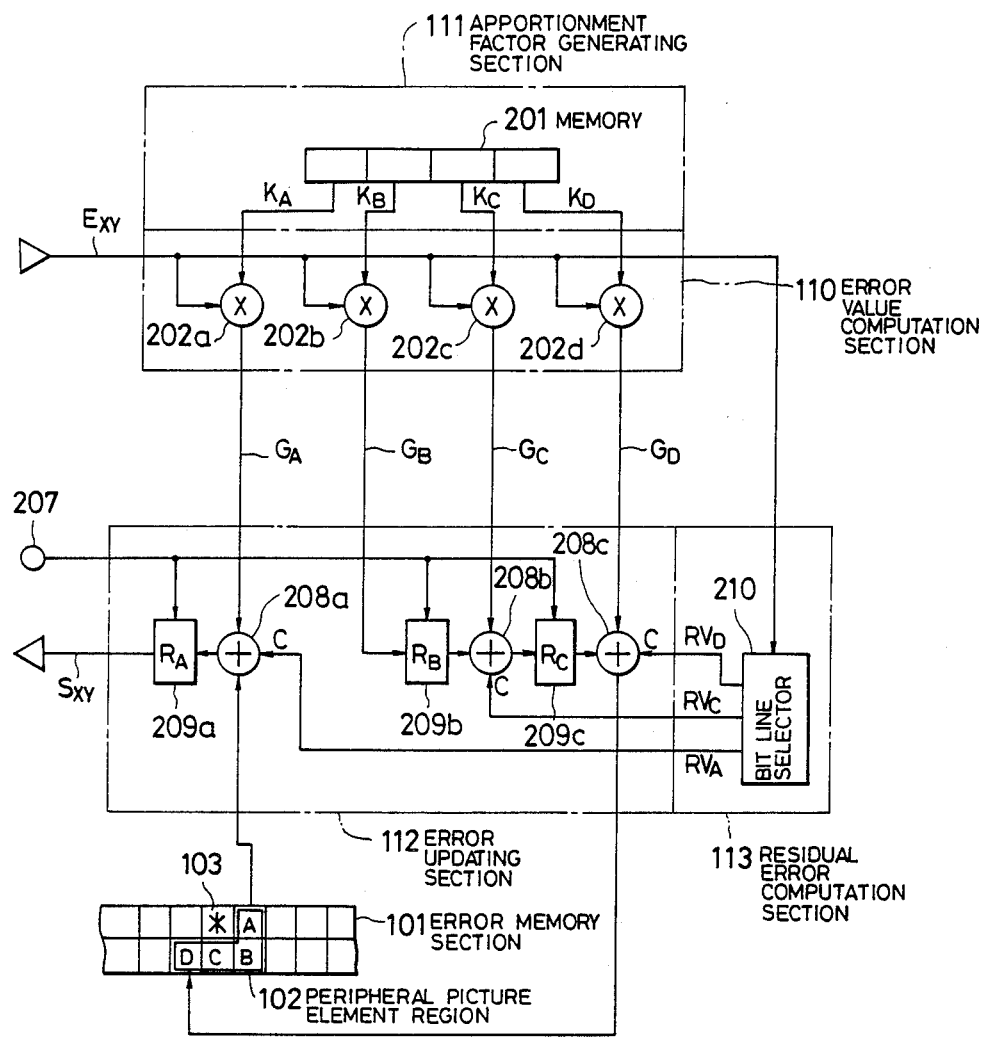

FIG. 2(b) shows another specific configuration for the apportionment factor generating section 111, the error apportionment value computation section 110, residual error computation section 113 and memory section 205, which can be utilized if the following values are adopted for the apportionment factors which apportion the bi-level error $E_{xy}$ among the the set of unprocessed picture elements positioned at the periphery of the object picture element:

$$K_{ij} = \begin{pmatrix} * & & 8/16 \\ 2/16 & 4/16 & 2/16 \end{pmatrix} \quad (5)$$

In the above, i and j denote respective coordinates along the horizonal and vertical directions, considering the set of positions in region 102 and the object picture element position, as a matrix array. In FIG. 2(b), the only blocks which differ from those of FIG. 2(a) are the residual error computation section 113 and error updating section 112 which are described in the following, while the apportionment value computation section 114 of the arrangement shown in FIG. 2(a) is eliminated.

In the embodiment of FIG. 2(b), the bi-level error $E_{xy}$ is a digital value consisting of more than three bits. The residual error computation section 113 contains a line selector 210 which extracts the three least significant bits of the data representing $E_{xy}$, and reapportions these bits as residual apportionment values $RV_A$, $RV_C$ and $RV_D$.

The error updating section 112 is substantially identical to that of FIG. 2(a), however the adders 208a, 208b and 208c which compute the new accumulated errors $S_A$ to $S_D$, are different in that a "carry" input terminal (designated as C) of each of these adders is utilized. The new accumulated errors $S_A$ to $S_D$ are obtained by adding the error apportionment values $G_A$ to $G_D$ to respective ones of the accumulated errors $S_A'$, $S_C'$ and $S_D'$ which were derived during previous picture element processing operations, and to the residual apportionment values $RV_A$, $RV_C$ and $RV_D$ respectively from the residual error computation section 113. Each of the residual apportionment values $RV_A$, $RV_C$ and $RV_D$ consists of a single data bit, these being respectively applied to the "carry" input terminals C of the adders 208a, 208b and 208c. This enables the apportionment value computation section 114 shown in FIG. 2(a) to be eliminated.

In this way, a practical circuit can be implemented, by utilizing the apportionment factor values set out in equation (6) above, whereby the computation operations and circuits can be substantially simplified by comparison with the system of FIG. 2(a).

With the first embodiment of the present invention, as described above, a bi-level error of an object picture element is apportioned as error apportionment values among a set of picture elements which are peripherally adjacent to that object picture element, with a residual error (which is the difference between the bi-level error and the sum total of the error apportionment values) being derived and reapportioned as a set of residual apportionment values. As a result, a problem which arises with a digital computation type of processing circuit for practical implementation of the error diffusion method, i.e. the problem of deterioration of the continuous tone reproduction characteristic when the input signal level represents a low image density or a high image density, is substantiall overcome.

Figure 3:
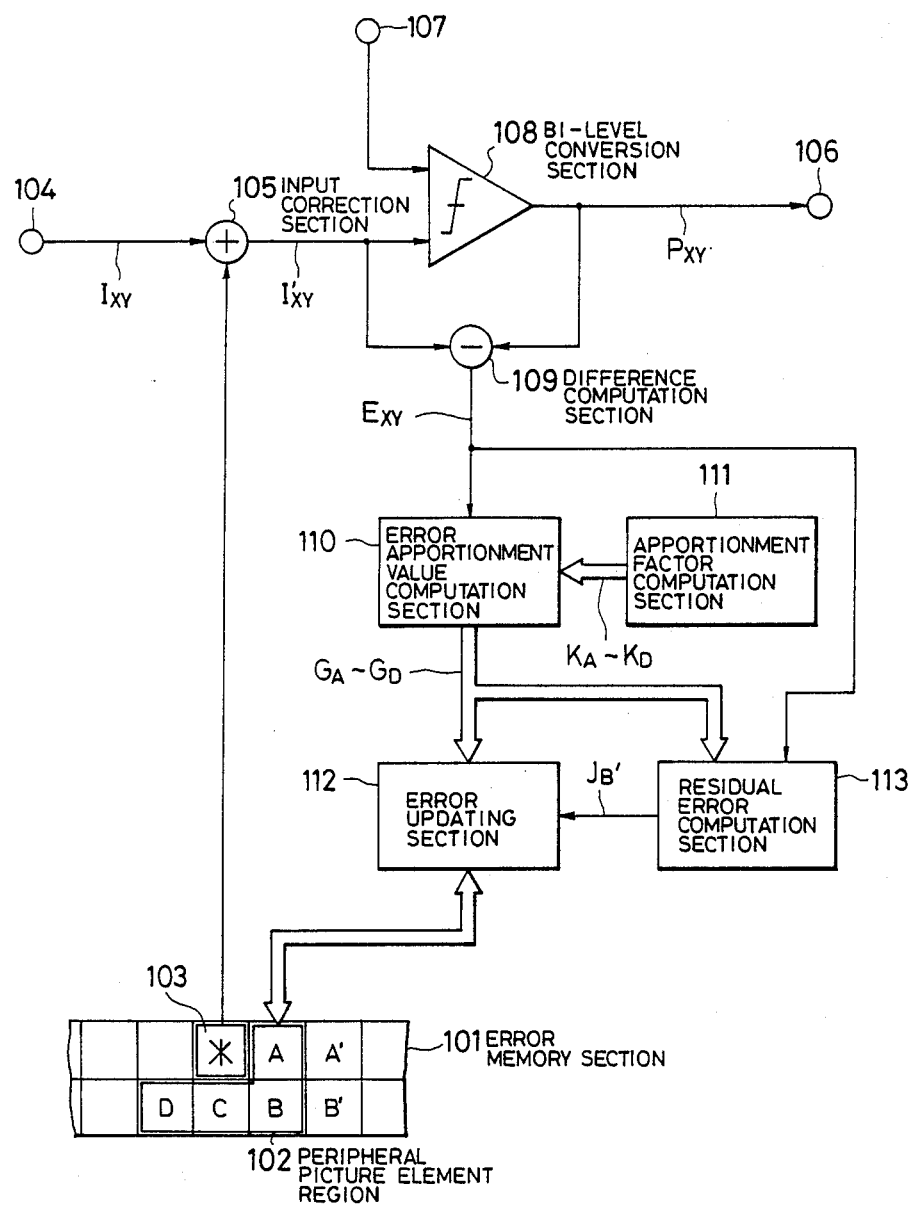
FIG. 3 is a conceptual block circuit diagram of a second embodiment of an image signal processing apparatus according to the present invention.

FIG. 3 is a general block diagram of a second embodiment of an image signal processing apparatus according to the present invention. The essential feature of this embodiment, as for the first embodiment, is that of elimination of the effects of an error resulting from digital computation of the error apportionment values by which the bi-level error $E_{xy}$ of the object picture element is apportioned among a set of peripherally adjacent picture element positions, i.e. a residual error whereby the sum total of these error apportionment values is not equal to the value of the bi-level error. In FIG. 3, each of blocks 101 to 111 is essentially identical to the correspondingly numbered block in FIG. 1, described hereinabove, so that further description of these will be omitted. The features of the second embodiment which are different from those of the first embodiment reside in an error updating section 112 and a residual error computation section 113, described in the following.

The residual error computation section 113 functions to derive, using equation (6) below, the residual error $J_B$ which is the difference between the sum total of the error apportionment values $G_A$ to $G_D$ and the bi-level error $E_{xy}$.

$$J_B = E_{xy} - \sum_{*=A}^{D} G^* \qquad (6)$$

The residual error $J_B$ is supplied to the error updating section 112. The error updating section 112 functions in synchronism with a sync signal (synchronized with successive picture element processing operations, as described for the first embodiment) to receive the error apportionment values $G_A$ to $G_D$ from the error apportionment value computation section 110 and the residual error $J_B$ from the residual error computation section 113 and to read out accumulated errors $S_A'$, $S_C'$, $S_D'$ which were obtained in previously executed picture element processing operations and stored in a memory unit at locations corresponding to the picture element positions A, C, D in the error memory section 101, and derives new values of accumulated errors $S_A$ to $S_D$ by using equations (7) below.

$$\left.\begin{array}{l} S_A = S_A' + G_A \\ S_B = J_B + G_B \\ S_C = S_C' + G_C \\ S_D = S_D' + G_D \end{array}\right\} \qquad (7)$$

In addition, the error updating section 112 performs updating processing by writing into the error memory section 101 the new accumulated errors $S_A$ to $S_D$, at locations respectively corresponding to the picture element positions A to D.

In the above description the residual error $J_B$ is obtained by using equations (7) on the basis of picture element position B within the peripheral picture element region 102. However it would be equally possible to use any of the other picture element positions A, B, C or D within that region for this purpose. In the following, it will be assumed that the picture element position B is used in equations (7).

It should also be noted that it would be equally possible to temporarily store the residual error $J_B$ within an internal register, and to read out this residual error at the time of processing the next picture element and add the residual error to the error apportionment value for any one of the picture element positions A', B', C' or D'.

Figure 4A:
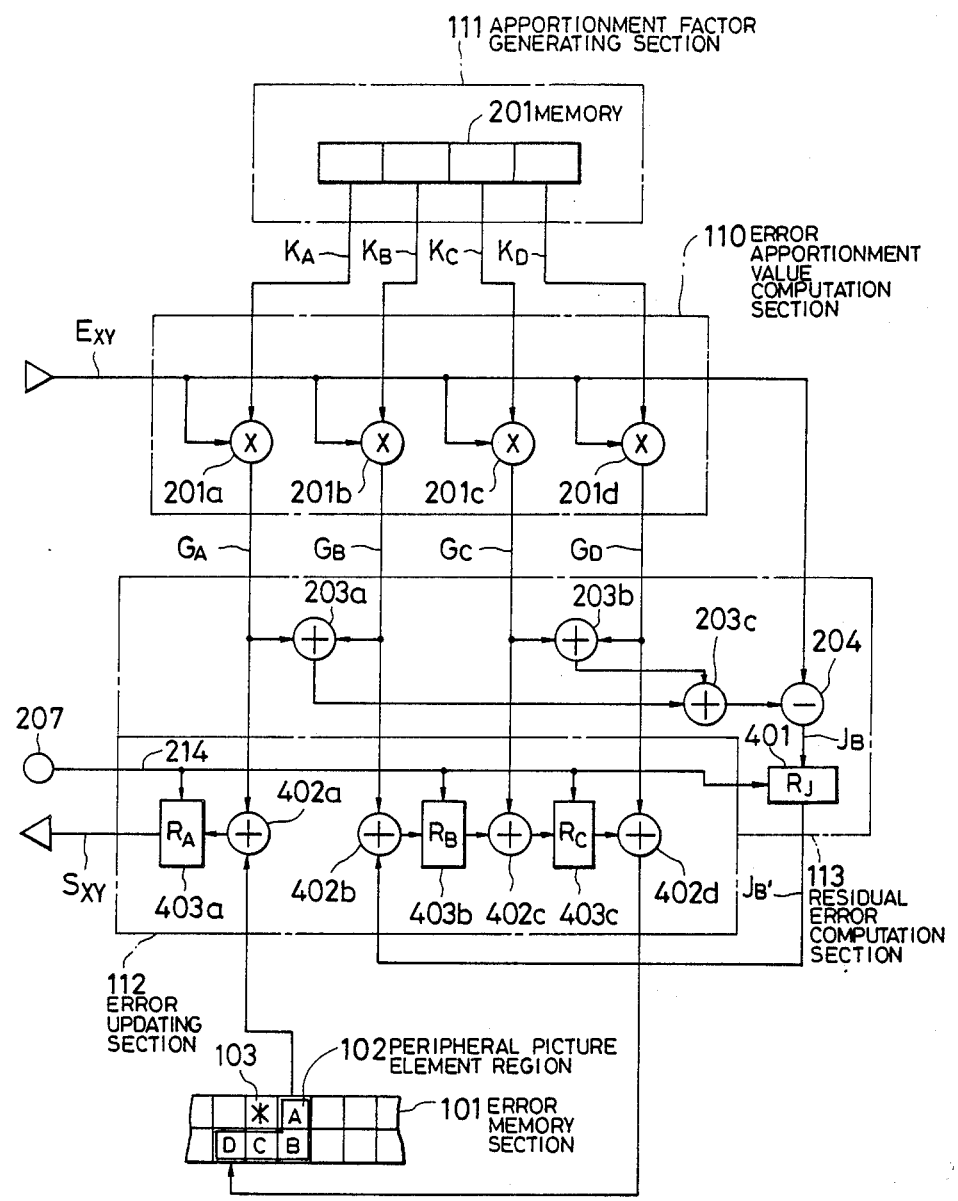
FIGS. 4(a) and 4(b) are block circuit diagrams respectively showing details of essential blocks shown in FIG. 3.

FIG. 4(a) shows a specific configuration for the error apportionment value computation section 110, the apportionment factor generating section 111, the error updating section 112 and the residual error computation section 113. With this configuration, the residual error $J_B$ is temporarily stored in an internal register, to be used in computing a value of accumulated error for the peripheral picture element position B, as described in the following.

The apportionment factor generating section 111 includes a memory section 201 having stored therein beforehand (i.e. prior to the commencement of image processing) a set of apportionment factors $K_A$ to $K_D$.

The memory section 201 can consist for example of a ROM (read-only memory).

The error apportionment value computation section 110 derives the respective products of the bi-level error $E_{xy}$ and each of the apportionment factors $K_A$ to $K_D$ (by a set of multipliers 201a to 201d) as the error apportionment values $G_A$ to $G_D$, and outputs these error apportionment values to the error updating section 112 and the residual error computation section 113.

The residual error computation section 113 computes the residual error $J_B$, which is the difference (computed by a subtractor 204) between the bi-level error $E_{xy}$ and the sum total of the error apportionment values $G_A$ to $G_D$ from the error apportionment value computation section 110 (computed by a set of adders 203a to 203c) and temporarily stores the result in an internal register 401 ($R_j$), until the succeeding picture element processing operation. A residual error $J_B'$ which had been derived and stored in the internal register 401 at the time of processing the preceding picture element is outputted at this time to the error updating section 112.

The error updating section 112 operates in synchronism with a sync signal 214, applied to a sync input terminal 207, which is synchronized with successive picture element processing operations, and adds (by an adder 402a) the error apportionment value $G_A$ to the accumulated error $S_A'$ for the picture element position A, read out from the error memory section 101, and temporarily stores the result in an internal register 403a ($R_A$) to be used as the accumulated error $S_{xy}$ during processing of the succeeding picture element. In addition, the accumulated error for picture element position B is added (by an adder 402b) to the residual error $J_B'$ which was temporarily stored in the residual error computation section 113 during processing of the preceding picture element, and stores the result as an accumulated error $S_B$ in the internal register 403b ($R_B$). The error apportionment value $G_C$ is added (by an adder 402c) to the data which had similarly been stored in the internal register 403b ($R_B$), and the result is temporarily stored in the internal register 403c ($R_C$) as the accumulated error $S_C$ for the picture element position C. The error apportionment value $G_D$ is added (by an adder 402d) to the data which had been temporarily stored in the internal register 403c ($R_C$), and the result is stored at a location in a memory unit of the error memory section 101 corresponding to the picture element position D, as the accumulated error $S_D$ for the picture element position D.

Thus, as for the first embodiment, the only accessing of the memory unit of the memory section 101 consists of read-out access corresponding to the picture element position A and write-in access corresponding to the picture element position D, so that a practical apparatus can be readily configured.

Figure 4B:
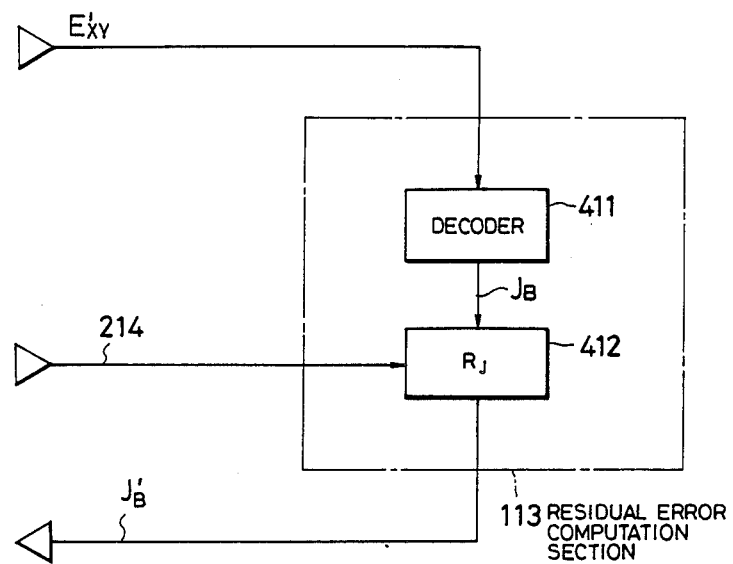

FIG. 4(b) shows a specific configuration for the residual error computing section 113, for the case in which the apportionment factors $K_{ij}$ for apportioning the bi-level error $E_{xy}$ among the picture elements which are peripherally adjacent to the object picture element are respectively determined to be as follows:

$$K_{ij} = \begin{pmatrix} * & * & 8/16 \\ 2/16 & 4/16 & 2/16 \end{pmatrix} \qquad (8)$$

In FIG. 4(b) a bi-level error $E_{xy}'$ consists of the least significant three bits of the bi-level error $E_{xy}$, and is inputted to a decoder 411 which thereby produces as output the residual error $J_B$ as a 2-bit data value. The relationships between the values of $E_{xy}'$ and $J_B$ established by this decoder 411 are as shown in the following table.

| $E_{xy}'$ | $J_B$ |
|---|---|
| 111 | 3 |
| 110 | 2 |
| 101 | 2 |
| 100 | 1 |
| 011 | 2 |
| 010 | 1 |
| 001 | 1 |
| 000 | 0 |

The residual error $J_B$ is temporarily stored in a register 412 and is read out during processing of the next picture element, as the residual error $J_B'$. In this way, by using a set of apportionment factors as specified in equation (8), a practical circuit configuration can be realized without the need for complex computations.

With the second embodiment of the present invention, as described in the above, a bi-level error of an object picture element is apportioned as error apportionment values among a set of picture elements which are peripherally adjacent to that object picture element, with the difference between the bi-level error and the sum total of the error apportionment values being derived during each picture element processing operation and used for correction to compensate for that error during a succeeding picture element processing operation. As a result, the problem which arises with a processing circuit having a digital computation type of processing circuit for practical implementation of the error diffusion method, i.e. the problem which arises with respect to the continuous tone reproduction characteristic for input signal levels representing low values of image density or high values of density due to the effects of the error, is substantially eliminated.

Figure 5:
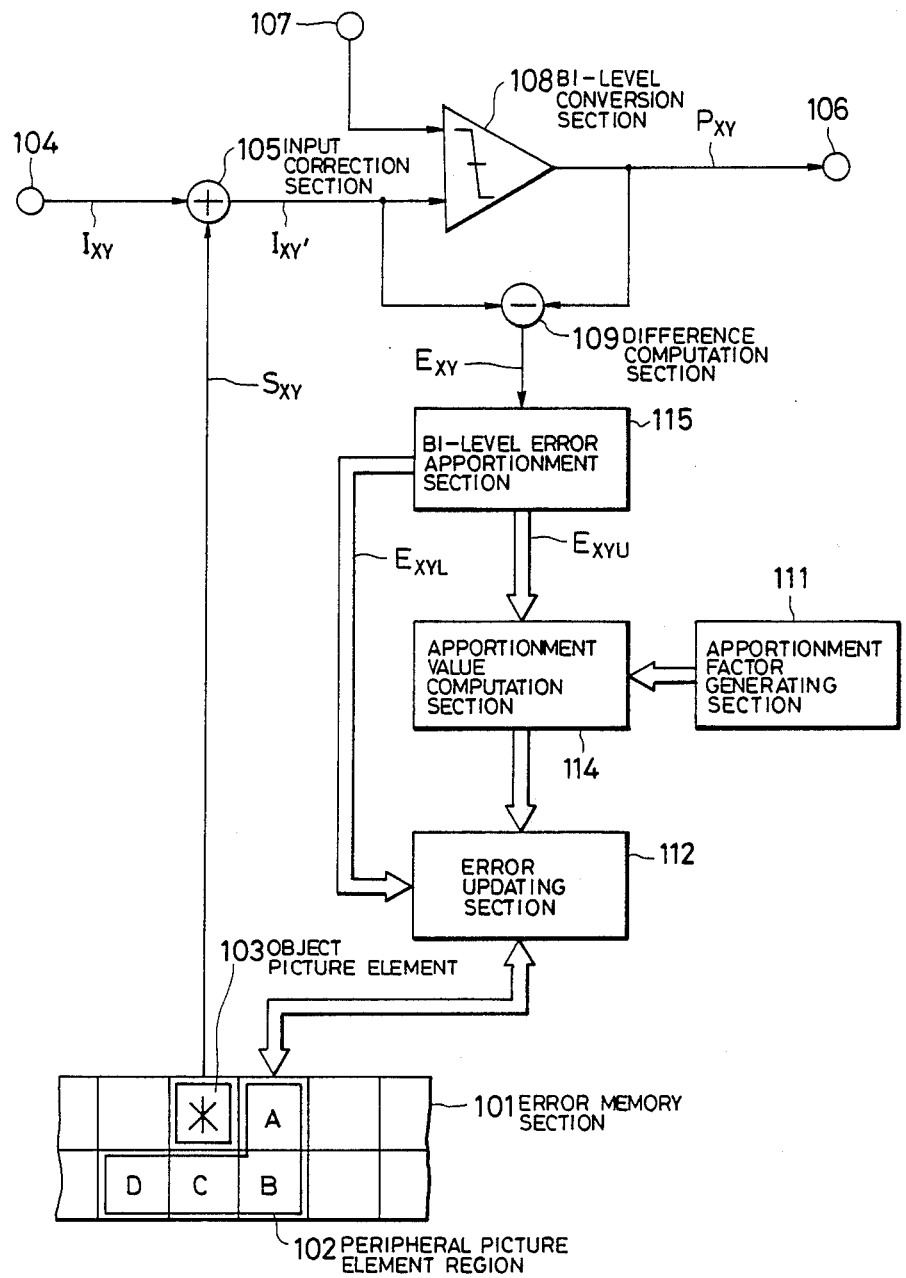
FIG. 5 is a conceptual block circuit diagram of a third embodiment of an image signal processing apparatus according to the present invention.

FIG. 5 is a conceptual block diagram of a third embodiment of an image signal processing apparatus according to the present invention. In FIG. 5, numerals 101 to 109 denote blocks which are similar to the correspondingly numbered blocks in the embodiment shown in FIG. 1, so that further description of these will be omitted. The circuit of FIG. 5 differs from that of FIG. 1 with respect to the respective configurations of the apportionment value computation section 114, apportionment factor generating section 111, error updating section 112 and bi-level error apportioning section, which will be described in detail in the following.

The bi-level error $E_{xy}$ is obtained as a digital value composed of more than n bits, where n is a fixed integer. The bi-level error apportionment section 115 functions to extract the n least significant bits of $E_{xy}$ and output these n bits as a bi-level error $E_{xyl}$ to the error updating section 112, and also sets each of the n least significant bits of the bi-level error $E_{xy}$ to zero and outputs the resultant converted value of $E_{xy}$ as a bi-level error $E_{xyu}$ to the apportionment value computation section 114.

The apportionment factor generating section 111 has stored therein beforehand a set of apportionment factors for a set of unprocessed picture elements positioned at the periphery of the object picture element, and outputs these apportionment factors $K_A$ to $K_D$ to the apportionment value computation section 114, for apportioning the bi-level error $E_{xyu}$ among these picture elements A to D within the peripheral picture element region 102.

The apportionment value computation section 114 operates in synchronism with a sync signal which is synchronized with successive picture element processing intervals, and utilizes the bi-level error $E_{xyu}$ for the object picture element (produced from the bit apportioning section 109) and the apportionment factors $K_A$ to $K_D$ to derive a set of error apportionment values $G_A$ to $G_D$ for the picture element positions A, B, C and D within the peripheral picture element region 102 of the error memory section 101, employing equations (9) given below.

$$\left.\begin{array}{l} G_A = K_A \times E_{xyu} \\ G_B = K_B \times E_{xyu} \\ G_C = K_C \times E_{xyu} \\ G_D = K_D \times E_{xyu} \end{array}\right\} \quad (9)$$

The apportionment value computation section 114 thereby produces the error apportionment values $G_A$ to $G_D$ as outputs, and supplies these to the error updating section 112.

The error updating section 112 operates in synchronism with the aforementioned sync signal, and functions to derive new values of accumulated error $S_A$ to $S_D$ respectively corresponding to the picture element positions A, B, C, D within the peripheral picture element region 102 of the error memory section 101, based on the error apportionment values $G_A$ to $G_D$, accumulated error values $S_A'$, $S_C'$ and $S_D'$ which were derived and stored in previously executed processing operations, and the bi-level error $E_{xyl}$ produced from the bi-level error apportioning section 115, by employing equations (10) below:

$$\left.\begin{array}{l} S_A = S_A' + G_A \\ S_B = E_{xyl} + G_B \\ S_C = S_C' + G_C \\ S_D = S_D' + G_D \end{array}\right\} \quad (10)$$

In this embodiment, the bi-level error $E_{xyl}$ is added to the error apportionment value for picture element position B of the peripheral picture element region 102. However it would be equally possible to add $E_{xyl}$ to any one of error apportionment values for the respective picture element positions A, B, C or D. In the following it will be assumed that picture element position B is utilized.

Figure 6:
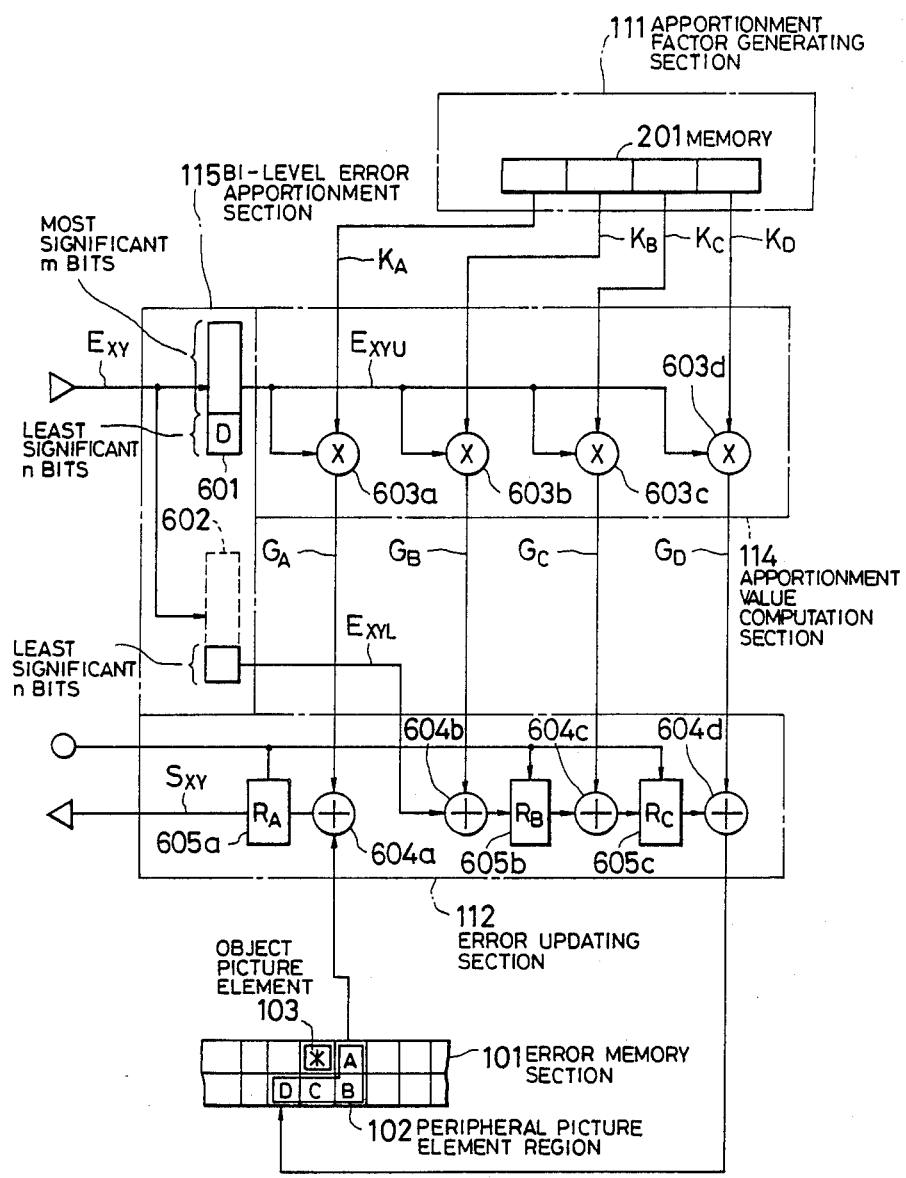
FIG. 6 is a block circuit diagram showing details of essential blocks shown in FIG. 5.

FIG. 6 shows specific configurations for the apportionment value computation 114, the apportionment factor generating section 111, the error updating section 112 and the bi-level error apportioning section 115. In this embodiment, the bi-level error $E_{xyl}$ is applied to the picture element position B, as described in the following.

The apportionment factor generating section 111 includes a memory section 201 having stored therein beforehand (i.e. prior to the commencement of image processing) a set of apportionment factors $K_A$ to $K_D$. The memory section 201 can consist for example of a ROM (read-only memory) having the apportionment factors written therein.

The bi-level error apportioning section 115 includes a bit apportioning section 601 which functions to reset the n least significant bits of the bi-level error $E_{xy}$ to logic "0", with the resultant converted value of $E_{xy}$ being outputted as the bi-level error $E_{xyu}$ to the error apportionment value computation section 114, and a bit apportioning section 602 which functions to extract the n least significant bits of the bi-level error $E_{xy}$ and to output these as the bi-level error $E_{xyl}$ to the error updating section 112.

The apportionment value computation section 114 multiplies each of the apportionment factors $K_A$ to $K_D$ by the bi-level error $E_{xyu}$ in a set of multipliers 603a to 603c, to thereby derive the error apportionment values $G_A$ to $G_D$, and outputs these to the error updating section 112.

The error updating section 112 operates in synchronism with a sync signal 214 applied to a sync input terminal 207 which is synchronized with successive picture element processing intervals, and adds the error apportionment value $G_A$ to the accumulated error $S_A'$ for the picture element position A, read out from the error memory section 101 (this addition being executed by an adder 604a), and temporarily stores the result in an internal register 605a ($R_A$) to be used as the accumulated error $S_{xy}$ during processing of the succeeding picture element. The accumulated error for picture element position B is obtained by adding the bi-level error $E_{xyl}$ from the bi-level error computation section 115 to the error apportionment value $G_B$ for picture element position B (by an adder 604b), and storing the result as an accumulated error $S_B$ in the internal register 605b ($R_B$), until the next processing interval. The error apportionment value $G_C$ is added by an adder 604c to the data which had been temporarily stored in the internal register 605b ($R_B$) at the time of processing the precedinng picture element, and the result is stored in the internal register 605c ($R_C$) as the accumulated error $S_C$ for the picture element position c, until the next procesing interval. The error apportionment value $G_D$ is added by an adder 604d to the data which had similarly been temporarily stored in the internal register 605c ($R_C$), and the result is stored at a memory location in the error memory section 101 corresponding to the picture element position D, as the accumulated error $S_D$ for that picture element position.

Due to the configuration for the error updating section 112 described above, the only accessing of the memory in the memory section 101 consists of read-out access corresponding to the picture element position A and write-in access corresponding to the picture element position B, so that a practical apparatus can be easily implemented.

With the third embodiment of the present invention, as described in the above, the n least significant bits of the bi-level error $E_{xy}$ are extracted and apportioned to one of the picture element positions which is peripherally adjacent to the object picture element position, while in addition these n least significant bits of the bi-level error $E_{xy}$ are reset to logic "0" and the resultant value is apportioned among each of the remaining peripheral picture element positions in accordance with the respective apportionment factors for these positions. As a result, this embodiment effectively eliminates the effects of an error which arises due to the effects of discarding low-significance bits of the bi-level error $E_{xy}$ during computation of the error apportionment values $G_A$ to $G_D$. Thus, the effective sum total of the error apportionment values used for aportioning the bi-level error $E_{xy}$ of the object picture element among the picture element positions peripherally adjacent thereto is made identical to that bi-level error. The embodiment thereby enables a practical integer computation type of processing circuit for implementing the error diffusion method to be realized, by considerably improving the step gradation reproduction characteristic for input signal levels which represent image regions of low density or high density.

Figure 7:
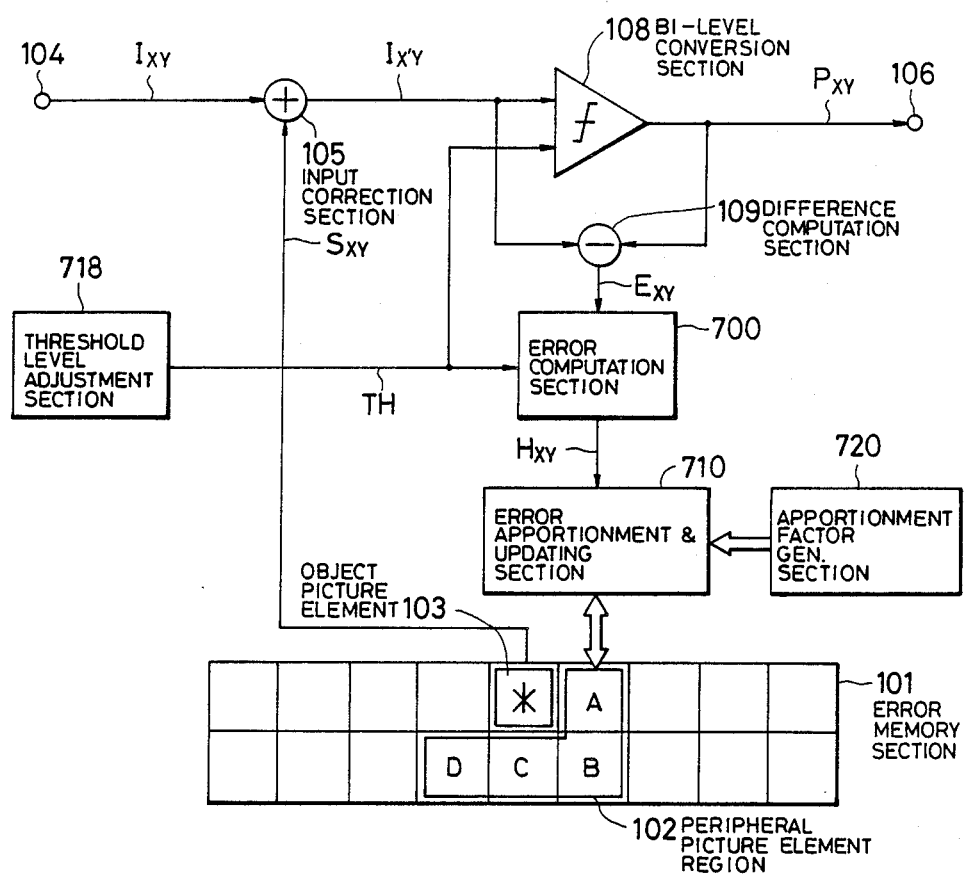
FIG. 7 is a conceptual block circuit diagram of a fourth embodiment of an image signal processing apparatus according to the present invention.

FIG. 7 is a conceptual block diagram of a fourth embodiment of an image signal processing apparatus according to the present invention. In FIG. 7, numerals 101 to 109 denote blocks which are similar to the correspondingly numbered blocks in the prior art apparatus for the error diffusion method shown in FIG. 1, so that description of these will be omitted. The apparatus of FIG. 7 differs from that of FIG. 1 with respect to an error computation section 700, an error apportionment and updating section 710, and an apportionment factor generating section 720, which will be described in detail in the following.

The error computation section 700 serves to derive a compensated error $H_{XY}$ by utilizing a factor Kt which is a function a threshold level TH (produced as described hereinafter,) and the bi-level error $E_{xy}$ which is produced from the difference computation section 109, by using equation (11) below:

$$H_{XY} = E_{xy} \times K_t(TH) \quad (11)$$

The apportionment factor generating section 720 has two sets of apportionment factors stored therein prior to the commencement of processing, corresponding to a set of picture elements peripherally adjacent to the object picture element, and operates in synchronism with successive picture element processing intervals to select from these sets of apportionment factors a set of apportionment factors KA to KD for apportioning the compensated error $H_{XY}$ among a plurality of picture element positions A to D within the peripheral picture element region 102, and supplies the selected apportionment factors to the error apportionment and updating section 710.

Numeral 718 denotes a threshold level adjustment section, which produces the threshold level value TH and which is operable (e.g. by the action of a user of the apparatus) to vary the value TH. Such variation of the threshold level applied the the bi-level conversion section 108 results in corresponding variations the overall density (i.e. overall darkness of lightness) of a bi-level display image which is produced utilizing the bi-level values from output terminal 106. The user can therby the adjust the overall image density as required.

The error apportioning and updating section 710 receives the apportionment factors KA to KD and the compensated error $H_{XY}$ of the object picture element, and apportions this error in accordance with the apportionment factors among the set of peripheral picture element positions of region 102 described above, as respective error apportionment values. The error apportioning and updating section 710 also reads out accumulated errors sa', sc' and sd' (which have been obtained in the processing operation executed for the preceding picture element) corresponding to the picture element positions A, C and B in the region 102, and derives new values of accumulated error $S_A$ to $S_D$ by using the following equations (12):

$$S_A = S_A' = K_A \times H_{XY}$$
$$S_B = K_B \times H_{XY}$$
$$S_C = S_C' = K_C \times H_{XY}$$
$$S_D = S_D' = K_D \times H_{XY}$$
(12)

Updating processing is then executed by the error apportionment and updating section 710, by writing the new values of the accumulated errors $S_A$ to $S_D$ into the error memory section 101 at locations which respectively correspond to the picture element positions A to D.

It would be equally possible to derive the compensated error $H_{XY}$ from the following equation (13):

$$H_{XY} = E_{xy} + (TH - R/2)$$ (13)

In the above, R is the maximum value of density level of the bi-level output, i.e. of $P_{xy}$.

Figure 8:
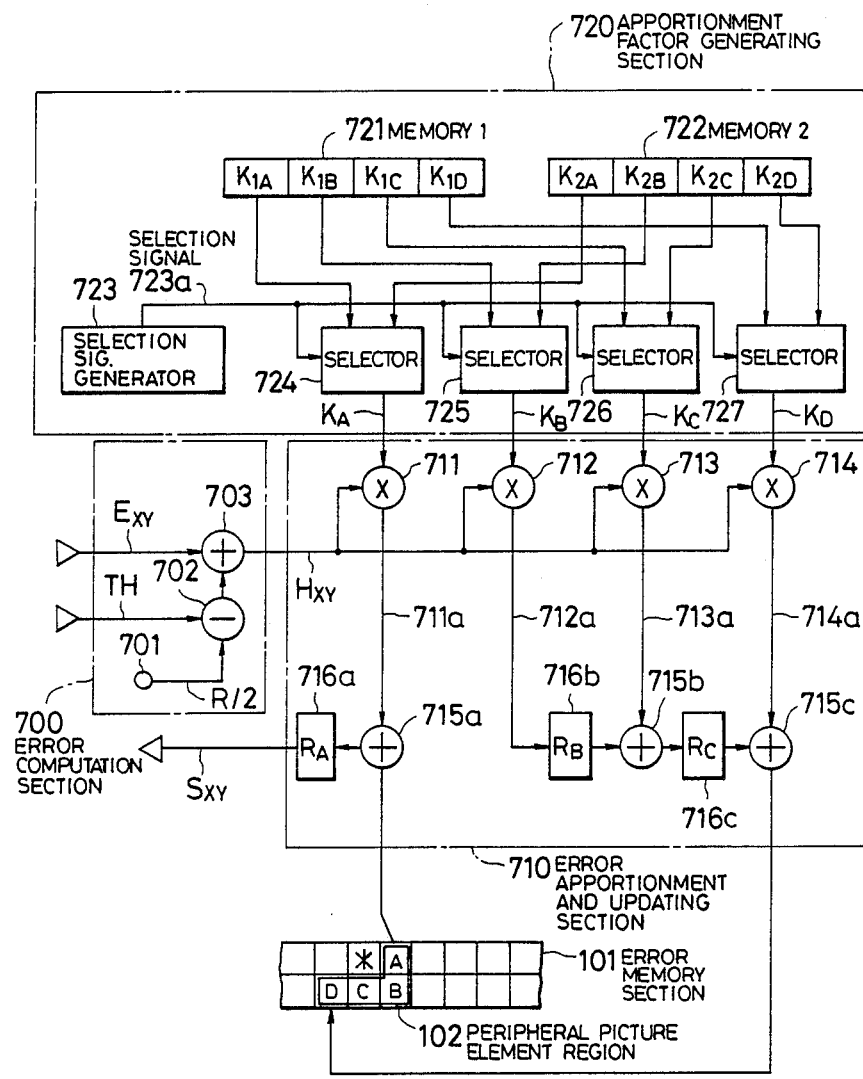
FIG. 8 is a block circuit diagram showing details of essential blocks shown in FIG. 7.

FIG. 8 shows specific configurations for the error computation section 700, the error apportionment and updating section 710 and the apportionment factor generating section 720. In FIG. 8, it is assumed that the error computation section 700 functions to derive the compensated error $H_{XY}$ by utilizing equation (13) above. The error computation section 700 performs this computation by utilizing the bi-level error $E_{xy}$ and the difference between the density level R/2 (which is applied to a density level input terminal 213) and the threshold level TH, and outputs the value of $H_{XY}$ thus computed to the error apportionment and updating section 710.

The apportionment value computation section 720 includes a memory 1 (721) and a memory 2 (722) having respectively stored therein prior to the commencement of image processing two sets of apportionment factors K1A to K1D and K2A to K2D. Apportionment factors are selected from among the contents of memories 721 and 722, to be produced as the set of apportionment factors $K_A$ to $K_D$, by a set of four selectors 724 to 727, with the selection thus executed being determined by a selection signal 723a applied from a selection signal generator 723. The selection signal generator 723 is configured such that the selection signal is a random signal, and can for example be implemented as a maximum length counter. Each of the selectors 724 to 727 has two input terminals and one output terminal, and each is controlled by the selection signal 723a for randomly selecting a set of apportionment factors KA to KD from the two sets of apportionment factors K1A to K1D and K2A to K2D in the first and second memories 721 and 204.

The apportionment value computation section 720 multiplies each of the apportionment factors KA to KD by the compensated error $H_{XY}$ supplied from the error computation section 760, to thereby produce error apportionment values 711a to 714a. The error apportionment value 711a is then added to the accumulated error $S_A'$ that corresponds to the picture element position A, (the accumulated error $S_A'$ being read out from a location of error memory section 101 corresponding to position A in the peripheral region 102) and the result of this is temporarily stored in an internal register 716a (RA) to be utilized as the accumulated error $S_{xy}$ for the next picture element to be processed in the succeeding processing step. Then, since the accumulated error for the picture element B is first produced during processing of the object picture element, the error apportionment value 712a is temporarily stored (without being altered) as the accumulated error (SB) for the picture element position B, in an internal register 716b (RB). The error apportionment value 713a and the data which were derived during the immediately preceding picture element processing operation and temporarily stored in the internal register 716b (RB) are added together, and the result of the addition is then temporarily stored in the internal register 716c (RC), as the accumulated error value (SC) for the picture element position C. The error apportionment value 217 is added to the data which were derived during the immediately preceding picture element processing operation and temporarily stored in the internal register 716c (RC), and the result of this addition is stored as the accumulated error (SD) for the picture element position D, in a memory location in the error memory section 101 which corresponds to the picture element position D.

As a result of this operation of the error apportionment and updating section 710 the only memory accessing which is required for the error memory section 101 consists of read-out access corresponding to the picture element A, and write-in access corresponding to the picture element D. Thus, a practical configuration for this embodiment can be easily implemented.

With the fourth embodiment of the present invention, as described in the above, the ratios by which the bi-level error of the object picture element is compensated by a factor which is a function of the threshold level, prior to apportionment of the bi-level error. As a result, density adjustment of the reproduced image by variation of the threshold level can be performed to adjust the overall image density of a bi-level display image produced from the output signal of the apparatus, while maintaining satisfactory error apportionment operation.

Figure 9:
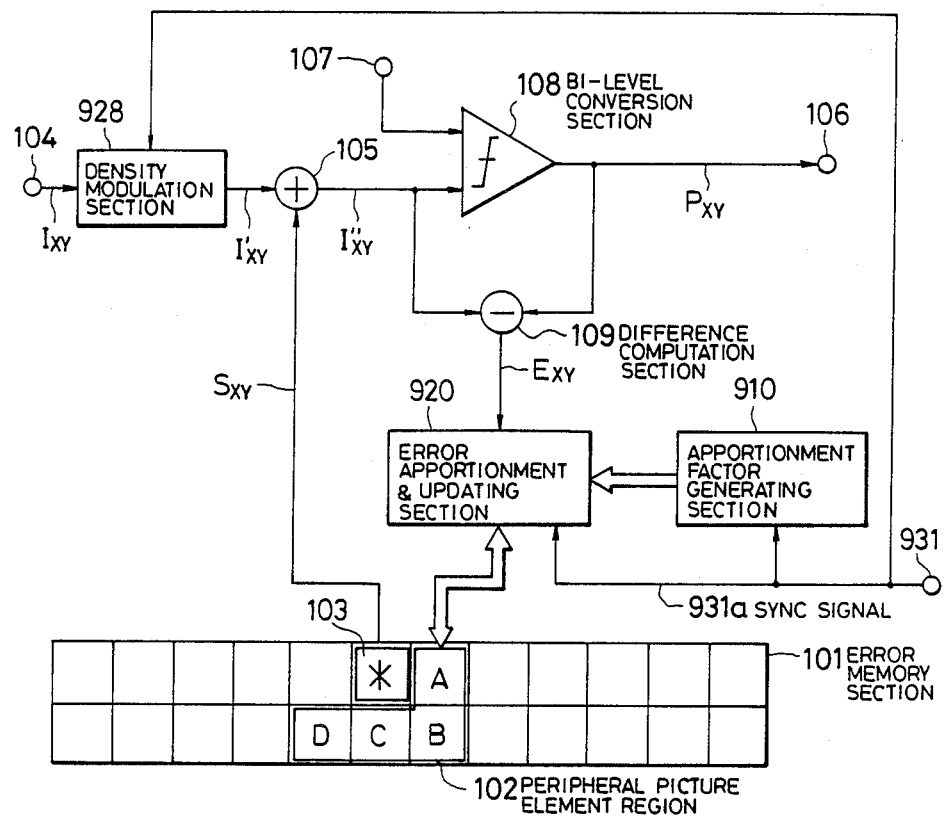
FIG. 9 is a conceptual block circuit diagram a of fifth embodiment of an image signal processing apparatus according to the present invention.

It is an inherent disadvantage of the prior art error diffusion method that any regions in the source image which have extremely uniform density will result in corresponding regions of the displayed bi-level image containing a texture pattern. A fifth embodiment of an image signal processing apparatus according to the present invention will be described whereby such a texture pattern can be substantially completely eliminated. FIG. 9 is a block diagram of the essential components of this embodiment.

Figure 10:
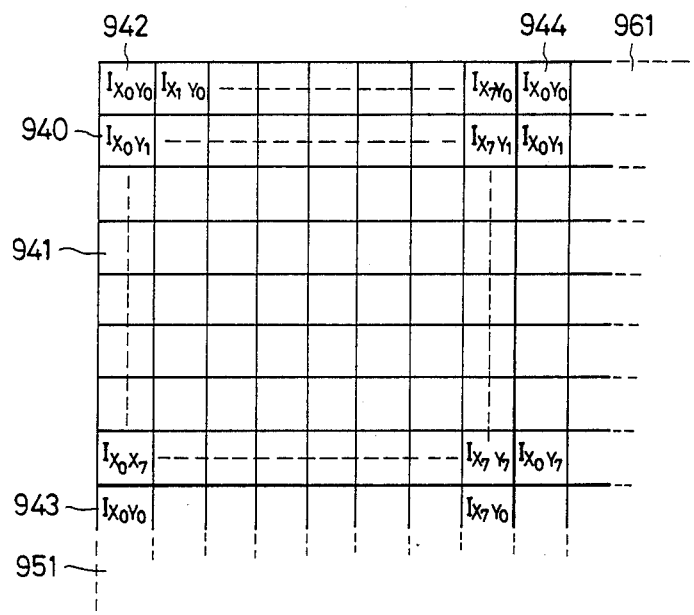
FIG. 10 is a diagram to illustrate an arrangement of sequentially positioned image regions for assisstance in describing the embodiment of FIG. 9.

The blocks numbered 101 to 109 in FIG. 9 are respectively identical to the correspondingly numbered blocks in FIG. 1, described hereinabove. This embodiment differs from the example of FIG. 1 with respect to error apportionment and updating section 900, apportionment factor generating section 910, and density modulation sectio 928, which are described in detail in the following. The density modulation section 928 functions to modulate the input image signal, i.e. the input level $I_{xy}$, such as to superimpose periodically positioned regions of modulated density upon the density levels of the source image, to produce an input level $I'_{xy}$. Each of these modulation regions can for example consist of an array of $8 \times 8$ picture element, as illustrated in FIG. 10. The function of this modulation of the source image density levels is to impart variations in density to any portions of the source image which are of highly uniform density, prior to bi-level conversion processing, and to thereby eliminate the generation of texture patterns in the resultant bi-level displayed image, which is an inherent feature of the prior art error diffusion method as described hereinabove. However the modulation within each of these regions is both positive and negative-directed, i.e. density is added to and subtracted from respective picture elements within each region, with this density addition and subtraction being executed such that the total resultant change in density within each region is zero. Thus, since each of the modulation regions is of extremely small size by comparison with the overall display image area, there will be no visibly perceptible effect upon the display image produced by utilizing the output bi-level signal from by the apparatus.

FIG. 10 illustrates an arrangement of such modulation regions, for the case in which each region consists of a rectangular array of 8×8 picture elements. Numeral 940 denotes the set of picture elements of the source image (only part of which are shown), numeral 941 a first modulation region, numeral 951 a modulation region positioned immediately below region 941, and numeral 961 a modulation region positioned immediately to the right of region 941. As shown, each modulation region consists of a rectangular array of picture elements which are respectively numbered from $I_{x0,y0}$ to $I_{x7,x7}$ (i.e. by coordinates which define position within each modulation region). Numeral 942 denotes the first picture element $I_{x0,y0}$ of modulation region 941, numeral 943 denotes picture element $I_{x0,y0}$ of region 951, and numeral 944 denotes picture element $I_{x0,y0}$ of modulation region 961.

Figure 11:
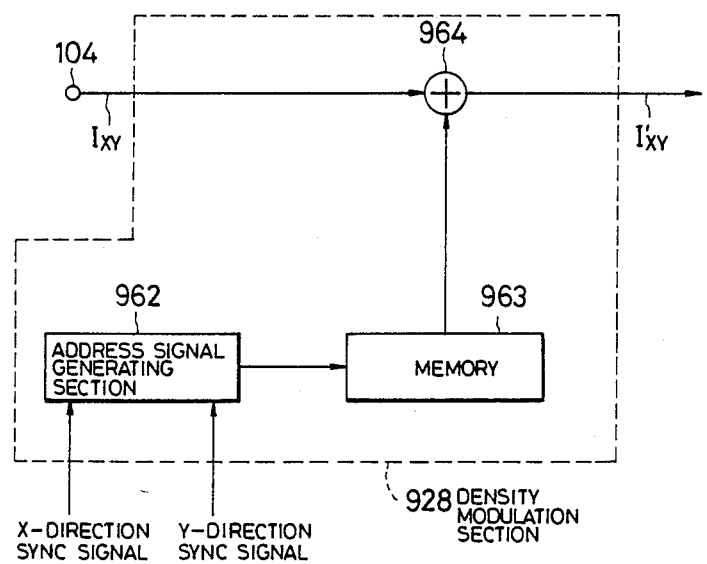
FIG. 11 is a conceptual block circuit diagram of an example of a density modulation section in the embodiment of FIG. 9.

FIG. 11 shows an example of a configuration for the density modulation section 920, in which an address signal generating circuit 962 is coupled to receive an x-direction sync signal (i.e. a signal which is synchronized with successive picture element processing intervals along the x-direction) and a y-direction sync signal (i.e. a signal which is synchronized with selection of successive lines of picture elements, along the y-direction), and produces address signals which are supplied to a memory 963. The memory 963 can be configured as a RAM (random access memory) or a ROM (read-only memory), and has a predetermined set of density values stored therein, for thereby producing output signals representing successive values which respectively vary in amplitude and polarity in response to successive address signals supplied from the address signal generating circuit 962. The values produced from the memory 963 are predetermined such that the sum total of these values within each of the modulation regions is zero. Each of these values is added to an input density level signal $I_{xy}$ in an adder 964, which produces an output density-modulated value $I_{xy}'$ to be supplied to the adder 105 in FIG. 9.

Thus, during processing of the first line of picture elements of the source image, a set of 8 values varying respectively in amplitude and polarity are successively produced from memory 963 and added to successive input level values in the adder 964 corresponding to picture elements $I_{x0,y0}$ to $I_{x7,y0}$ of the first modulation region 941, the same set of 8 values are then once more read out from memory 963 for the second modulation region 961, and so on. The same process thereafter occurs, with a different set of 8 values being repetitively read out from memory 963, during processing of the second line of picture elements. When the 9th line of picture elements is reached, the second row of modulation regions begins to be modulated, by the same sequences of output values from the memory 963 as were produced for the first row.

It should be noted that it would also be possible to achieve the effects of the address signal generating circuit 962 and the memory 963 by utilizing a shift register circuit.

Referring again to FIG. 9, the apportionment factor generating section 910 has stored beforehand therein one set of apportionment factors (i.e. corresponding in number to a set of unprocessed picture elements positioned at the periphery of the object picture element) as shown for example in FIGS. 2(a), (b), FIG. 4(a) or FIG. 6 described hereinabove, and functions to randomly select from that set of apportionment factors a set of apportionment factors $K_A$ to $K_D$ for respectively apportioning the bi-level error $E_{xy}$ among a plurality of picture element positions A to D within the peripheral picture element region 102, and supplies the selected apportionment factors to the error apportionment and updating section 900. The error apportionment and updating section 900 operates in synchronism with the sync signal 931a (i.e. the x-direction sync signal as described hereinabove) to store in the error memory section 103 the bi-level error $E_{xy}$ of an object picture element (produced from difference computation section 109) in accordance with the apportionment factors $K_A$ to $K_D$, at memory locations corresponding to the picture element positions A, C and D respectively within the peripheral picture element region 102. The error apportionment and updating section 900 also reads out accumulated errors $S_A'$, $S_C'$ and $S_D'$ (which have been obtained in previously executed picture element processing operations) corresponding to the picture element positions A, C and B in the peripheral picture element region 102, and derives new accumulated errors $S_A$ to $S_D$ by using the following equation (14):

$$\begin{aligned} S_A &= S_A' + K_A \times E_{xy} \\ S_B &= K_B \times E_{xy} \\ S_C &= S_C' + K_C \times E_{xy} \\ S_D &= S_D' + K_D \times E_{xy} \end{aligned} \quad (14)$$

Updating processing is then executed by the error apportionment and updating section 900, by writing the new values of the accumulated errors $S_A$ to $S_D$ into the error memory section 101 at locations which respectively correspond to the picture element positions A to D.

With this embodiment of the invention, due to the fact that level values varying in amplitude and polarity in a manner which is independent of the source image are added to the density levels of respective picture elements of the source image, a texture pattern which is produced in the processed output image when using prior art error diffusion method in the case of a source image containing regions of highly uniform density is effectively suppressed. Since computer-generated images frequently contain regions of extremely uniform image density, this embodiment of the invention provides a practical apparatus for display of computer-generated images by a bi-level display device.

In each of the embodiments of the present invention described above, it is necessary to conscutively execute three basic operations within each picture element processing period (i.e. within each period of the x-direction sync signal). These operations are, for example referring to FIG. 7:

(1) Read out the stored accumulated error $S_{xy}$ for the object picture element, and apply this to compensate the input level value $I_{xy}$ for the object picture element, to produce a corrected level value $I_{xy}'$.

(2) Compare this corrected level value with a threshold level, to determine a bi-level output value $P_{xy}$ for the object picture element, and subtract that output valve from the corrected level value $I_{xy}'$ to obtain a bi-level error value $E_{xy}$ for the object picture element.

(3) Utilize this errorn value $E_{xy}$ to derive respective values of accumulated error for the set of peripherally adjacent picture elements to the object picture element (A, B, C and D).

Figure 12:
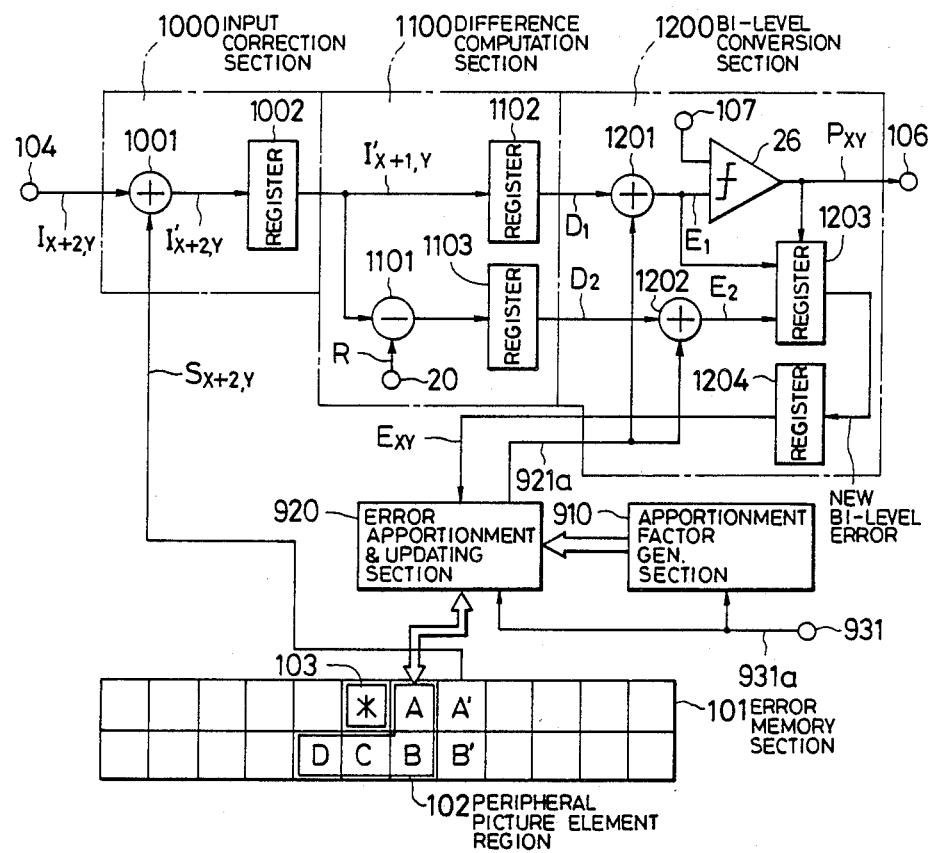
FIG. 12 is a conceptual block circuit diagram of a sixth embodiment of the present invention.

The above three basic operations must be performed consecutively, since a result obtained in each of the basic operations (1) and (2) is required for the succeeding operation. The total time required to successively execute all of these basic operations during each picture element processing period determines the speed at which image processing can be performed by such an apparatus. FIG. 12 is a general block diagram showing the essential elements of a sixth embodiment of an image signal processing apparatus according to the present invention, which has the objective of providing a high speed of image processing by eliminating the necessity to consecutively execute all of the above basic operations for each picture element during a single processing period. In FIG. 12, components 101 to 103, 106 and 931 of FIG. 10 respectively correspond to the identically numbered components in FIG. 9 above.

Numeral 1000 denotes an input computation section, numeral 1100 denotes a difference computation section, numeral 1200 denotes a bi-level conversion section, numeral 920 denotes an error apportionment and updating section, and numeral 910 denotes an apportionment factor generating section. In the input computation section 1000, during the processing period in which the object picture element having coordinates (x, y) is being processed to obtain a corresponding output bi-level value $P_{xy}$, an input level value $I_{x+2,y}$ for the picture element having coordinates (x+2,y), i.e. corresponding to picture element position A' of the error memory section 101, is applied from input terminal 104 to be added to the corresponding accumulated error $S_{x+2,y}$ which is read out from the error memory section 101, in an adder 1001. These operations are synchronized by an x-direction sync signal 931a applied to terminal 931. A corrected level value $I'_{x+2,y}$ corresponding to the picture element position A' (i.e. the picture element position to be processed after position A) is thereby derived during one processing interval, and is temporarily stored in a register 1002 to be read out during the next processing interval.

During the processing interval in which level value $I'_{x+2,y}$ is derived as described above, a level value $I'_{x+1,y}$ (i.e. corresponding to the picture element position A of the error memory section 101) which was temporarily stored in the register 1002 during the immediately preceding picture element processing period, is read out from the input computation section 1000 to be temporarily stored in a register 1102 of the difference computation section 1100 and at the same time is applied to one input of a subtractor 1101 of the difference computation section 1100. A level value R (i.e. one of the two possible values R or 0 of the bi-level output signal produced by the apparatus) is applied to the other input of subtractor 1101, and the resultant subtraction value is temporarily stored in a register 1103 of the difference computation section 1100. As a result, the registers 1102 and 1103 now respectively contain values representing the level value $I'_{x+1,y}$ having each of the two possible values 0 and R of the bi-level output signal subtracted therefrom. These respective register contents are designated as error difference levels $D_1$ and $D_2$.

During the processing interval in which the input level $I_{x+2,y}$ is derived as described above, the error difference levels $D_1$ and $D_2$ corresponding to the object picture element (which had been stored during the preceding processing interval) are read out from registers 1102 and 1104 respectively. Also during this processing interval, a bi-level error $E_{xy}$ which was stored in a register 1204 during the preceding processing period (as described hereinafter) is read out from register 1204, and is utilized by the error apportionment and updating section 920 to generate a set of error apportionment values corresponding to picture element positions A, B, C and D in a similar manner to that described for previous embodiments, e.g. as shown in FIG. 8. An error apportionment value 921a corresponding to the picture element position A is thereby produced from the error apportionment and updating section 920 and is added to each of the difference levels $D_1$ and $D_2$ to thereby obtain respective errors $E_1$ and $E_2$ respectively. The error $E_1$ is compared in a comparator 26 with a predetermined threshold value to thereby derive a bi-level value $P_{xy}$ for the object picture element, which is produced from output terminal 106. At the same time, either error $E_1$ or $E_2$ is selected by the selector 1203, in accordance with the level of the bi-level value $P_{xy}$ which has been determined (i.e. R or 0) and the selected error is temporarily stored as an updated value of bi-level error in a register 1204, to be used in the succeeding processing period.

The apportionment factor generating section 910 contains a plurality of sets of apportionment factors, and periodically selects (i.e. once in each picture element processing period) a set of apportionment factors from these. The selected apportionment factors $K_A$, $K_B$, $K_C$ and $K_D$ are supplied to the error apportionment and updating section 920 as in the previously described embodiments. The apportionment factor generating section 910 operates in synchronism with the x-direction sync signal 931a, applied from input terminal 931. The error apportionment and updating section 920 utilizes the apportionment factors $K_A$ to $K_D$ for apportioning the bi-level error $E_{xy}$ among the picture element positions A to D respectively within the peripheral picture element region 102 of the error memory section 101, and operates in synchronism with the sync signal 931a to generate updated values of accumulated error for the picture element positions A to D and store these at corresponding memory locations. The error apportionment and updating section 920 reads out accumulated errors $S_C'$ and $S_D'$ (which have been obtained in the preceding processing period) and derives new accumulated errors $S_A$ to $S_D$ by using the following equations (15):

$$\left.\begin{aligned} S_A &= = K_A \times E_{xy} \\ S_B &= K_B \times E_{xy} \\ S_C &= S_{C'} + K_C \times E_{xy} \\ S_D &= S_{D'} + K_D \times E_{xy} \end{aligned}\right\} \quad (15)$$

Updating processing is then executed by the error apportionment and updating section 920, by writing the new values of the accumulated errors $S_A$ to $S_D$ into the error memory section 101 at locations which respectively correspond to the picture element positions A to D.

Figure 13:
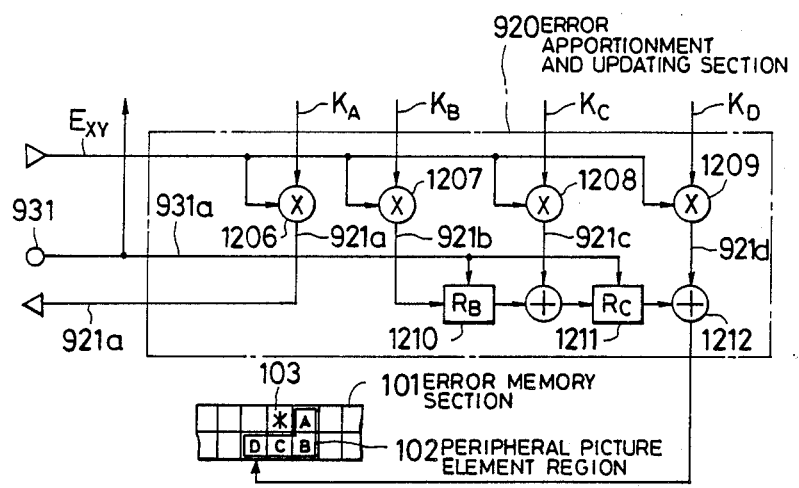
FIG. 13 is a block circuit diagram showing details of an error apportionment and updating section in the embodiment of FIG. 12.

FIG. 13 illustrates the configuration of the error apportionment and updating section 920 of this embodiment, for executing the computations set out in equations (15) above. As shown, a set of multipliers 1206 to 1209 serve to generate the error apportionment values $K_A \times E_{xy}$ to $K_D \times E_{xy}$ respectively, with the error apportionment value $K_A \times E_{xy}$ being supplied as value 921a to the adders 1201 and 1202 in FIG. 12, to produce the error values $E_1$ and $E_2$ described above.

It can be understood from the above that with the sixth embodiment of the present invention, all of the aforementioned basic operations (1), (2) and (3) are performed concurrently for three different picture elements, within a single processing interval, rather than consecutively as in the case of the preceding embodiments. This is to say, the difference computation section 1100 computes the two possible values for difference level $D_1$ and $D_2$ for a picture element position (x,y) during the processing period immediately previous to that in which the bi-level output value for that picture element is derived by the bi-level conversion section 1200. In addition, the input computation section 1000 computes the corrected input level $I_{xy}'$ for the picture element position (x,y) during the processing period immediately preceding that in which these difference levels $D_1$ and $D_2$ are derived. These difference levels are then each added to the appropriate error apportionment value, to derive values which can be considered as respective provisional values of bi-level error for the object picture element, and the apparatus functions by selecting one of these two provisional values on the basis of the bi-level value determined for the object picture element.

Due to concurrent form of processing executed by this embodiment, a substantially higher processing speed can be attained than is possible with the preceding embodiments.

What is claimed is:

1. An image signal processing apparatus for sequentially processing input level values representing respective density levels of an array of picture elements representing an image, to produce corresponding bi-level values, comprising:

error memory means for storing a bi-level error of an object picture element in a set of memory locations respectively corresponding to a set of picture elements which have not yet been processed by the signal processing apparatus and are peripherally adjacent to a position of the object picture element in the image;

input correction means for adding an input level value of the object picture element to an accumulated error which is stored at a location in the error memory means corresponding to the object picture element position, to thereby produce a corrected input level value;

bi-level conversion means for comparing the corrected input level value with a predetermined level value to thereby determine a bi-level value for the object picture element;

difference computing means for obtaining a bi-level error which is the difference between the corrected input level value and the bi-level value determined for the object picture element;

apportionment factor generating means for generating apportionment factors for apportioning the bi-level error among the set of picture elements which have not yet been processed;

error apportionment value computing means for computing, based on the bi-level error of the object picture element and on the apportionment factors, a set of error apportionment values respectively corresponding to the set of picture elements which have not yet been processed;

residual error computing means for computing the sum total of the error apportionment values and for subtracting the sum total from the bi-level error produced by the difference computing means, to obtain a residual error, and for apportioning the residual error to respective ones of the set of unprocessed picture elements as a set of residual error apportionment values by utilizing specific factors to determine the respective residual error apportionment values;

apportionment value computing means for computing respective apportionment values for the set of unprocessed picture elements, based on the error apportionment values and the residual error apportionment values; and error updating means for adding the apportionment values to respective accumulated error values which are stored at respectively corresponding locations in the error memory means, and for storing results of the additions in the error memory means as updated accumulated error values.

2. An image signal processing apparatus for sequentially processing input level values representing respective density levels of an array of picture elements representing an image, to produce corresponding bi-level values, comprising:

error memory means for storing a bi-levl error of an object picture element in a set of memory locations respectively corresponding to a set of picture elements which have not yet been processed by the signal processing apparatus and are peripherally adjacent to a position of the object picture element in the array;

input correction means for adding an input level value of the object picture element to an accumulated error which is stored at a location in the error memory means corresponding to the object picture element position, to thereby produce a corrected input level value;

bi-level conversion means for comparing the corrected input level value with a predetermined level value to thereby determine a bi-level value for the object picture element;

difference computing means for obtaining a bi-level error which is the difference between the corrected input level value and the bi-level value determined for the object picture element;

apportionment factor generating means for generating apportionment factors for apportioning the bi-level error among the set of picture elements which have not yet been processed;

error apportionment value computing means for computing, based on the bi-level error of the object picture element and on the apportionment factors, a set of error apportionment values respectively corresponding to the set of picture elements which have not yet been processed;

residual error computing means for computing the sum total of the error apportionment values and for subtracting the sum total from the bi-level error produced by the difference computing means, to obtain a residual error, and for apportioning the residual error as a set of residual error apportionment values to respective ones of the set of unprocessed picture elements, by utilizing specific factors to determine the respective residual error apportionment values;

apportionment value computing means for computing respective apportionment values for the set of unprocessed picture elements, based on the error apportionment values and the residual error apportionment values; and error updating means for adding the apportionment values to respective accumulated error values which are stored at respectively corresponding locations in the error memory means, and for storing results of the additions in the error memory means as updated accumulated error values;

in which the apportionment factor generating means generates the apportionment factors as a combination of the ratios 8/16, 4/16, 2/16 and 2/16, in which the bi-level error is obtained as a binary value comprising moe than three bits, and in which the residual error computing means determines respective residual apportionment values corresponding to the set of unprocessed picture elements positioned peripheral to the object picture element in accordance with respective logic levels of three least significant bits of the bi-level error.

3. An image signal processing apparatus for sequentially processing input level values representing respective density levels of an array of picture elements representing an image, to produce corresponding bi-level values, comprising:

error memory means for storing a bi-level error of an object picture element in a set of memory locations respectively corresponding to a set of picture elements which have not yet been processed by the signal processing apparatus and are peripherally adjacent to a position of the object picture element in the array;

input correction means for adding an input level value of the object picture element to an accumulated error which is stored at a location in the error memory means corresponding to the object picture element position, to thereby produce a corrected input level value;

bi-level conversion means for comparing the correct input level value with a predetermined level value to thereby determine a bi-level value for the object picture element;

difference computing means for obtaining a bi-level error which is the difference between the corrected input level value and the bi-level value determined for the object picture element;

apportionment factor generating means for generating apportionment factors for apportioning the bi-level error among the set of picture elements which have not yet been processed;

error apportionment value computing means for computing, based on the bi-level error of the object picture element and on the apportionment factors, a set of error apportionment values respectively corresponding to the set of picture elements which have not yet been processed residual error computing means for deriving the sum total of the error apportionment values and for subtracting the sum total from the bi-level error to obtain a residual error; and error updating means for adding one of the error apportionment values to the residual error, and for adding the remaining ones of the error apportionment values to respective accumulated error values which are stored at respectively corresponding locations in the error memory means, and storing results of each of these additions in the error memory means as updated accumulated error values.

4. An image signal processing apparatus for sequentially processing input level values representing respective density levels of an array of picture elements representing an image, to produce corresponding bi-level values, comprising:

error memory means for storing a bi-level error of an object picture element in a set of memory locations respectively corresponding to a set of picture elements which have not yet been processed by the signal processing apparatus and are peripherally adjacent to a position of the object picture element in the array;

input correction means for adding an input level value of the object picture element to an accumulated error which is stored at a location in the error memory means corresponding to the object picture element position, to thereby produce a corrected input level value;

bi-level conversion means for comparing the corrected input level value with a predetermined level value to thereby determine a bi-level value for the objectpicture element;

difference computing means for obtaining a bi-level error which is the difference between the corrected input level value and the bi-level value determined for the object picture element;

apportionment factor generating means for generating apportionment factors for apportioning the bi-level error among the set of picture elements which have not yet been processed;

error apportionment value computing means for computing, based on the bi-level error of the object picture element and on the apportionment factors, a set of error apportionment values respectively corresponding to the set of picture elements which have not yet been processed;

residual error computing means for deriving the sum total of the error apportionment values and for subtracting the sum total from the bi-level error to obtain a residual error; and error updating means for adding one of the error apportionment values to the residual error, and for adding the remaining ones of the error apportionment values to respective accumulated error values which are stored at respectively corresponding locations in the error memory means, and storing results of each of these additions in the error memory means as updated accumulated error values;

in which, during a first processing interval the residual error computing means derives the sum of the error apportionment values corresponding to the set of unprocessed picture elements positioned peripheral to the object picture element, computes the residual error as a difference between the sum of the error apportionment values and the bi-level error, and temporarily stores the residual error which is thus obtained, to be read out during a processing interval immediately succeeding the first processing interval.

5. An image signal processing apparatus for sequentially processing input level values representing respective density levels of an array of picture elements representing an image, to produce corresponding bi-level values, comprising:

error memory means for storing a bi-level error of an object picture element in a set of memory locations respectively corresponding to a set of picture elements which have not yet been processed by the signal processing apparatus and are peripherally adjacent to a position of the object picture element in the array;

input correction means for adding an input level value of the object picture element to an accumulated error which is stored at a location in the error memory means corresponding to the object picture element position, to thereby produce a corrected input level value;

bi-level conversion means for comparing the corrected input level value with a predetermined value to determine a bi-level value for the object picture element;

difference computing means for obtaining a bi-level error $E_{xy}$ which is the difference between the corrected input level value and the bi-level value of the object picture element;

bi-level error apportionment means for extracting the n least significant bits of the bi-level error $E_{xy}$, where n is a predetermined fixed integer, and producing these bits as a bi-level error $E_{xyl}$, and for setting each of these n least significant bits of the bi-level error $E_{xy}$ to zero and outputting the result as a bi-level error $E_{xyu}$;

apportionment factor generating means for generating apportionment factors for apportioning the bi-level error $E_{xyu}$ among the set of picture elements which have not yet been processed;

apportionment value computing means for computing, based on the bi-level error $E_{xyu}$ and the apportionment factors from the apportionment factor generating means, apportionment values respectively corresponding to the set of picture elements which have not yet been processed; and error updating means for adding a predetermined one of the error apportionment values to the bi-level error $E_{xyl}$ and for adding the remaining error apportionment values to respective accumulated error values which are at respectively corresponding locations in the error memory means, and for storing addition results obtained thereby in the error memory means as respective updated accumulated error values.

6. An image signal processing apparatus for sequentially processing input level values representing respective density levels of an array of picture elements representing an image, to produce corresponding bi-level values, comprising:

error memory means for storing a bi-level error of an object picture element in a set of memory locations respectively corresponding to a set of picture elements which have not yet been processed by the signal processing apparatus and are peripherally adjacent to a position of the object picture element in the array;

input correction means for adding an input level value of the object picture element to an accumulated error which is stored at a location in the error memory means corresponding to the object picture element position, to thereby produce a corrected input level value;

bi-level conversion means for comparing the corrected input level value with a pedetermined level value to thereby determine a bi-level value for the object picture element;

difference computation means for obtaining a bi-level error which is the difference between the corrected input level value and the bi-level value determined for the object picture element;

error computing means for computing an amended error based on the bi-level error and a factor which is a function of the threshold level;

apportionment factor generating means for generating apportionment factors for apportioning the amended error among the set of picture elements which have not yet been processed, the apportionment factors being generated by selection from a plurality of sets of apportionment factors at intervals having a predetermined aleration period; and error apportionment and updating means for computing error apportionment values respectively corresponding to the set of picture elements which have not yet been processed, based on the correction error and the apportionment factors, adding the error apportionment values to respective accumulated error values which are stored at respectively corresponding locations in the error memory means, and for storing addition results obtained thereby in the error memory means as updated accumulated error values.

7. An image signal processing apparatus for sequentially processing input level values representing respective density levels of an array of picture elements representing an image, to produce corresponding bi-level values, comprising:

error memory means for storing a bi-level error of an object picture element in a set of memory locations respectively corresponding to a set of picture elements which have not yet been processed by the signal processing apparatus and are peripherally adjacent to a position of the object picture element in the array;

input correction means for adding an input level value of the object picture element to an accumulated error which is stored at a location in the error memory means corresponding to the object picture element position, to thereby produce a corrected input level value;

bi-level conversion means for comparing the corrected input level value with a predetermined level value to thereby determine a bi-level value for the object picture element;

difference computation means for obtaining a bi-level error which is the difference between the corrected input level value and the bi-level value determined for the object picture element;

error computing means for computing an amendd error based on the bi-level error and a factor which is a function of the threshold level;

apportionment factor generating means for generating apportionment factors for apportioning the amended error among the set of picture elements which have not yet been processed, the apportionment factors being generated by selection from a plurality of sets of apportionment factors at intervals having a predetermined alteration period; and error apportionment and updating means for computing error apportionment values respectively corresponding to the set of picture elements which have not yet been processed, based on the correction error and the apportionment factors, adding the error apportionment values to respective accumulated error values which are stored at respectively corresponding locations in the error memory means, and for storing addition results obtained thereby in the error memory means as updated accumulated error values;

in which the error computing means derives the amended error as a difference between the threshold level value and one-half of the a bi-level value.

8. An image signal processing apparatus for sequentially processing input level values representing respective density levels of an array of picture elements representing an image, to produce corresponding bi-level values, comprising:

density modulation means for adding to the input level values respective ones of successively generated values which vary in amplitude and polarity independently of the input level values, to produce successive modulated input level values;

error memory means for storing a bi-level error of an object picture element in a set of memory locations respectively corresponding to a set of picture elements which have not yet been processed by the signal processing apparatus and are peripherally adjacent to a position of the object picture element in the array;

input correction means for adding a modulated input level value of the object picture element to an accumulated error which is stored at a location in the error memory means corresponding to the object picture element position, to thereby produce a corrected input level value;

bi-level conversion means for comparing the corrected input level value with a predetrermined level value to thereby determine a bi-level value for the object picture element;

difference computing means for obtaining a bi-level error which is the difference between the corrected input level value and the bi-level value of the object picture element;

apportionment factor generating means for generating apportionment factors for apportioning the bi-level error among the set of picture elements which have not yet been processed, the apportionment factors being generated by randomly altering correspondences between picture element positions and apportionment factors of a single set of apportionment factors, the random alteration being executed at periodic intervals; and error apportionment and updating means for computing error apportionment values respectively corresponding to the set of picture elements which have not yet been processed, based on the bi-level error and the apportionment factors, adding the error apportionment values to respective accumulated error values which are stoed at respectively corresponding locations in the error memory means, and for storing results of the additions in the error memory means as updated accumulated error values.

9. An image signal processing apparatus for sequentially processing input level values representing respective density levels of an array of picture elements representing an image, to produce corresponding bi-level values, comprising:

density modulation means for adding to the input level values respective ones of successively generated values which vary in amplitude and polarity independently of the input level values, to produce successive modulated input level values;

error memory means for storing a bi-level error of an object picture element in a set of memory locations respectively corresponding to a set of picture elements which have not yet been processed bythe signal processing apparatus and are peripherally adjacent to a position of the object picture element in the array;

input correction means for adding a modulated input level value of the object picture element to an accumulated error which is stored at a location in the error memory means corresponding to the object picture element position, to thereby produce a corrected input level value;

bi-level conversion means for comparing the corrected input level value with a predetermined level value to thereby determine a bi-level value for the object picture element;

difference computing means for obtaining a bi-level error which is the difference between the corrected input level value and the bi-level value of the object picture element;

apportionment factor generating means for generating apportionment factors for apportioning the bi-level error among the set of picture elements which have not yet been processed, the apportionment factors being generated by randomly altering mutual correspondences between picture element positions and apportionment factors of a single set of apportionment factors, the random alteration being executed at periodic intervals; and error apportionment and updating means for computing error apportionment values respectively corresponding to the set of picture elements which have not yet been processed, based on the bi-level error and the apportionment factors, adding the error apportionment values to respective accumulated error values which are stored at respectively corresponding locations in the error memory means, and for storing results of the additions in the error memory means as updated accumulated error values;

in which the density modulation means superimposes successive density levels upon respective input level values of successive picture elements by cyclically generating predetermined sets of density levels, the density levels being generated in synchronism with successive picture element processing intervals.

10. An image signal processing apparatus for sequentially processing input level values representing respective density levels of an array of picture elements representing an image, to produce corresponding bi-level values, comprising:
  error memory means for storing a bi-levl error of an object picture element in a set of memory locations respectively corresponding to a set of picture elements which have not yet been processed by the signal processing apparatus and are peripherally adjacent to a position of the object picture element in the array;
  input correction means for adding a input level value of the object picture element to an accumulated error which is stored at a location in the error memory means corresponding to the object picture element position, to thereby produce a corrected input level value;
  difference computing means for subtracting the corrected input level from first and second output levels to produce a first difference level value $D_1$ and a second difference level value $D_2$ respectively, prior to obtaining the bi-level value for the object picture element, and storing the first and second difference level values temporarily in respective difference level registers;
  bi-level conversion means for respectively adding the difference level values $D_1$ and $D_2$, read out from the difference level registers, to a bi-level error which is stored in a bi-level error register, to thereby obtain errors $E_1$ and $E_2$ respectively, comparing the error $E_1$ with a predetermined threshold value to thereby obtain a bi-level value for the object picture element, selecting error $E_1$ or error $E_2$ in accordance with the bi-level value thus obtained, to thereby obtain a bi-level error for the object picture element, and storing the bi-level error temporarily in the bi-level error register for use during a succeeding picture element processing operation;
  apportionment factor generating means operating once in each of predetermined picture element processing intervals for generating a set of apportionment factors, by selection from a plurality of sets of apportionment factors, for apportioning the bi-level error of the object picture element among the set of picture elements which have not yet been processed; and
  error apportionment and updating means for computing respective error apportionment values corresponding to the set of picture elements which have not yet been processed, based on a value of bi-level error read out from the bi-level error register and the set of apportionment factors produced from the apportionment factor generating means, adding the error apportionment values to respective values of accumulated error which are stored at locations in the error memory means respectively coresponding to the set of peripheral picture elements, and storing the respective addition results in the error memory means as updated accumulated error values.

11. An image signal processing apparatus for sequentially processing input level values representing respective density levels of an array of picture elements representing an image, to produce corresponding bi-level values, comprising:
  error memory means for storing a bi-level error of an object picture element in a set of memory locations respectively corresponding to a set of picture elements which have not yet been processed by the signal processing apparatus and are peripherally adjacent to a position of the object picture element in the array;
  input correction means for adding an input level value of the object picture element to an accumulated error which is stored at a location in the error memory means corresponding to the object picture element position, to thereby produce a corrected input level value;
  difference computing means for subtracting the corrected input level from first and second output levels to produce a first difference level value $D_1$ and a second difference level value $D_2$ respectively, prior to obtaining the bi-level value for the object picture element, and storing the first and second difference level values temporarily in respective difference level registers;
  bi-level conversion means for respectively adding the difference level values $D_1$ and $D_2$, read out from the difference level registers, to a bi-level error which is stored in a bi-level error register, to thereby obtain errors $E_1$ and $E_2$ respectively, comparing the error $E_1$ with a predetermined threshold value to thereby obtain a bi-level value for the object picture element, selecting error $E_1$ or error $E_2$ in accordance with the bi-level value thus obtained, to thereby obtain a bi-level error for the object picture element, and storing the bi-level error temporarily in the bi-level error register for use during a succeeding picture element processing operation;
  apportionment factor generating means operating once in each of predetermined picture element processing intervals for generating a set of apportionment factors, by selection from a plurality of sets of apportionment factors, for apportioning the bi-level error of the object picture element among the set of picture elements which have not yet been processed; and
  error apportionment and updating means for computing respective error apportionment values corresponding to the set of picture elements which have not yet been processed, based on a value of bi-level error read out from the bi-level error register and the set of apportionment factors produced from the apportionment factor generating means, adding the error apportionment values to respective values of accumulated error which are stored at locations in the error memory means respectively corresponding to the set of peripheral picture elements, and storing the respective addition results in the error memory means as updated accumulated error values;
  in which during a first processing interval in which a bi-level value corresponding to a first picture element is derived by the bi-level conversion means; difference level values $D_1$ and $D_2$ corresponding to a second picture element are respectively derived by the difference computing means and temporarily stored to be read out and transferred to the bi-level conversion means during a second processing interval following the first processing interval, and a corrected input value corresponding to a third picture element is derived by the input correction means and temporarily stored to be read out to the difference computing means during the second processing interval.

* * * * *